(12) United States Patent
Thompson et al.

(10) Patent No.: US 7,775,063 B2
(45) Date of Patent: Aug. 17, 2010

(54) METHOD AND APPARATUS FOR HARVESTING WATER AND LATENT ENERGY FROM A GASEOUS MIXTURE

(76) Inventors: Christopher E. Thompson, 342 Loire Valley Dr., Simi Valley, CA (US) 93065; Owen E. Thompson, 342 Loire Valley Dr., Simi Valley, CA (US) 93065

( * ) Notice: Subject to any disclaimer, the term of this patent is extended or adjusted under 35 U.S.C. 154(b) by 479 days.

(21) Appl. No.: 11/627,216

(22) Filed: Jan. 25, 2007

(65) Prior Publication Data

US 2008/0178625 A1 Jul. 31, 2008

(51) Int. Cl.
*F25D 23/00* (2006.01)
*F25D 23/06* (2006.01)

(52) U.S. Cl. .......................................... 62/271; 62/273
(58) Field of Classification Search .................. 62/237, 62/271; 60/649, 673, 508–515
See application file for complete search history.

(56) References Cited

U.S. PATENT DOCUMENTS

| | | | |
|---|---|---|---|
| 3,095,923 A | 7/1963 | Foutz | |
| 3,304,696 A | 2/1967 | McKenna | |
| 3,894,393 A | 7/1975 | Carlson | |
| 3,953,971 A | 5/1976 | Parker | |
| 4,106,294 A | 8/1978 | Czaja | |
| 4,106,295 A | 8/1978 | Wood | |
| 4,206,396 A | 6/1980 | Marks | |
| 4,275,309 A | 6/1981 | Lucier | |
| 4,433,552 A | 2/1984 | Smith | |
| 4,583,370 A | 4/1986 | Assaf | |
| 4,624,109 A * | 11/1986 | Minovitch | 60/648 |
| 4,801,811 A | 1/1989 | Assaf et al. | |
| 4,878,349 A | 11/1989 | Czaja | |
| 4,885,913 A * | 12/1989 | Czaja | 60/673 |
| 5,266,837 A | 11/1993 | Kinoshita | |
| 5,477,684 A | 12/1995 | Prueitt | |
| 5,483,798 A | 1/1996 | Prueitt | |
| 5,608,268 A | 3/1997 | Senanayake | |
| 5,983,640 A | 11/1999 | Czaja | |
| 6,057,606 A | 5/2000 | Porat | |
| 6,230,503 B1 | 5/2001 | Spletzer et al. | |
| 6,360,549 B1 | 3/2002 | Spletzer et al. | |
| 6,422,016 B2 | 7/2002 | Alkhamis | |
| 6,453,684 B1 * | 9/2002 | Spletzer et al. | 62/93 |
| 6,510,687 B1 | 1/2003 | Zaslavsky et al. | |
| 6,511,525 B2 | 1/2003 | Spletzer et al. | |
| 6,647,717 B2 | 11/2003 | Zaslavsky et al. | |

* cited by examiner

*Primary Examiner*—Frantz F. Jules
*Assistant Examiner*—Cassey Bauer
(74) *Attorney, Agent, or Firm*—Brooks Kushman P.C.

(57) ABSTRACT

An apparatus harvests latent energy and water by adiabatically decompressing a controlled volume of atmospheric air to lower its pressure and temperature below the saturation point of included water vapor, thus causing the water vapor to change state to nonvaporous water and release to the decompressed air thermal energy associated with the change of state. The apparatus then extracts the nonvaporous water, leaving the released thermal energy in the decompressed air. The apparatus then recompresses the decompressed air, which will have a resulting temperature, and thus a thermal energy, greater than those of the initially ingested air, and harvests the recompressed air and its increased thermal energy. The apparatus can also humidify and warm atmospheric air before it is ingested to increase appreciably the amount of harvested thermal energy.

8 Claims, 15 Drawing Sheets

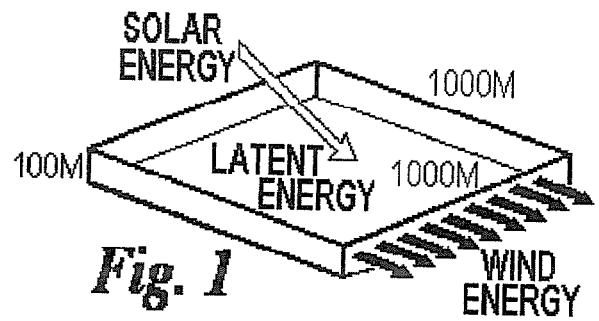
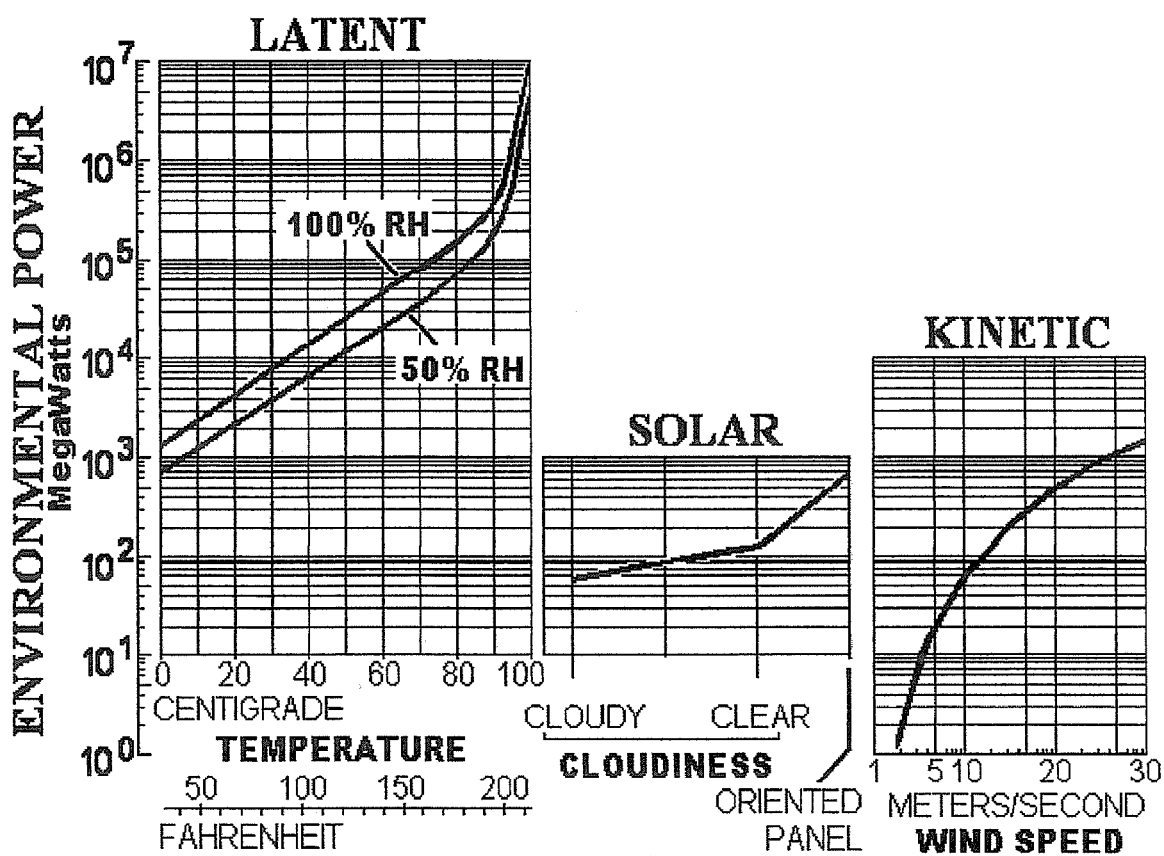

METHOD AND APPARATUS FOR HARVESTING WATER AND LATENT ENERGY FROM A GASEOUS MIXTURE

BACKGROUND OF THE INVENTION

1. Field of the Invention

This invention relates to a method for harvesting latent energy and nonvaporous water from atmospheric air.

2. Background Art

There has been an increasing interest in environmental energy harvesting. The most well-developed methodologies focus on wind energy, solar energy, and the energy of water flowing under the influence of gravity. A number of strategies have also been developed for harvesting latent energy from atmospheric air. Some of these strategies depend on added water vapor and vertically decreasing atmospheric pressure to stimulate an upward movement of air. Such air within an enclosed, vertical conduit is forced by a pressure differential to rise through a wind turbine driving an electric generator to extract energy. In another strategy, air at the conduit base is warmed; and warm water vapor is added. The vapor is assumed to condense as air rises within the enclosed conduit, warming the air and enhancing upward motion. The condensed water is removed in an upper region of the conduit. Other strategies seek similar results but depend on evaporating liquid water into air, thus cooling the air and stimulating the air to move downwardly rather than upwardly. This process finds useful application, for example, in cleaning pollution from industrial stacks, where there is no interest in energy harvesting. Another strategy has liquid water pumped to a high elevation and sprayed into environmental air at that level to cool the air by evaporation. The evaporative air cooling is performed within a conduit that extends from a high to a low altitude, and kinetic energy of the resulting downdraft of air is extracted by a wind turbine driving an electric generator.

Still other strategies do not depend on pressure-altitude differences but disclose machine means for harvesting energy from water vapor provided by a boiler. At least one other strategy uses a flash evaporator to produce steam and a steam-driven turbogenerator to produce energy, and another depends on elaborate machine means to harvest energy by liquefying air itself rather than merely liquefying water vapor.

A number of strategies disclose the removal of condensed liquid water from an air-water mixture contained within a closed volume. One discloses means to control the formation of condensate into liquid droplets using a condensing surface of inverted circular cones attached to a metal plate. Another discloses means for collecting water blown off a cooling coil by high velocity air, improving such collection by coils used in low-fluid-velocity water collection systems. Yet another discloses the use of charged aerosol sources powered directly by the wind. The means comprise a large area electrode screen, which emits charged water droplets into a wind stream as a wind-electric power transducer. Still another discloses means for harvesting water from air that involve an isothermal compression to a saturated state that requires means to remove energy from the process to maintain the isothermal compression. In contrast, the process of the present invention adiabatically decompresses, with no exchange of energy with an external environment, a controlled volume of atmospheric air to a pressure at which resident water vapor reaches a saturated state.

SUMMARY OF THE INVENTION

An object of the present invention is to provide a process for harvesting latent energy and nonvaporous water, that is, liquid or solid water, from water vapor in atmospheric air. In carrying out the foregoing object, the process for harvesting latent energy includes decompressing a controlled volume of the atmospheric air so that the temperature of the air is decreased to a point where the water vapor reaches saturation; and the water vapor changes state by condensation, and possibly by deposition, and releases latent heat. Nonvaporous water resulting from the state change of the water vapor is then extracted to an internal water reservoir that is separated from, but at the same pressure as, the controlled volume of air, thus rendering the process of latent heat harvesting nearly irreversible. The decompressed air is then recompressed so that, as a result of having absorbed the latent heat released by the water vapor, the recompressed air has a much higher temperature than it had prior to being decompressed. The latent energy of the recompressed air and the nonvaporous water are then harvested.

Another object of the present invention is to provide an apparatus that functions according to the process described by the foregoing paragraph. The apparatus includes a thermally insulated chamber defining therewithin a controllable volume; and it further includes a controllable inlet, or air ingestion valve, for admitting atmospheric air into the chamber. A thermally insulated decompressing mechanism for adiabatically increasing the controllable volume of the chamber is provided to lower the temperature of the humid air within the chamber so that the water vapor in the humid air reaches a point of saturation, changes state and releases latent heat. A nonvaporous water extracting valve is provided to extract nonvaporous water resulting from the state change of the water vapor within the chamber. The extracted water is retained within an internal water reservoir for harvesting after the controlled volume of air has been recompressed to a desired state of release. A recompressing mechanism is provided for decreasing the controllable volume of the chamber to increase the temperature of the air; and an air harvesting valve is provided to release the recompressed air so that thermal energy, associated with latent heat absorption and the resulting increase in its temperature, can be harvested. A nonvaporous water harvesting valve is also provided to harvest the nonvaporous water retained in the internal water reservoir.

In the process and apparatus of the present invention described by the foregoing paragraphs, decompression and recompression are performed adiabatically. Those skilled in the art to which the present invention pertains will appreciate that, in practical applications, the term "adiabatic" is taken to mean nearly adiabatic.

BRIEF DESCRIPTION OF THE DRAWINGS

FIG. 1 is a perspective view of a model representing exemplary dimensions of a particular volume of atmospheric air;

FIG. 2 is a graph illustrating the power potentially realizable by harvesting latent energy from the particular volume of atmospheric air of FIG. 1;

FIG. 3 is a graph illustrating the comparative power potentially realizable by harvesting energy converted from solar energy impinging on the same volume of atmospheric air as illustrated by FIG. 1.

FIG. 4 is a graph illustrating the comparative power potentially realizable by harvesting kinetic energy from the same volume of atmospheric air of FIG. 1 moving at various velocities;

DETAILED DESCRIPTION OF THE PREFERRED EMBODIMENTS

Figure 5:
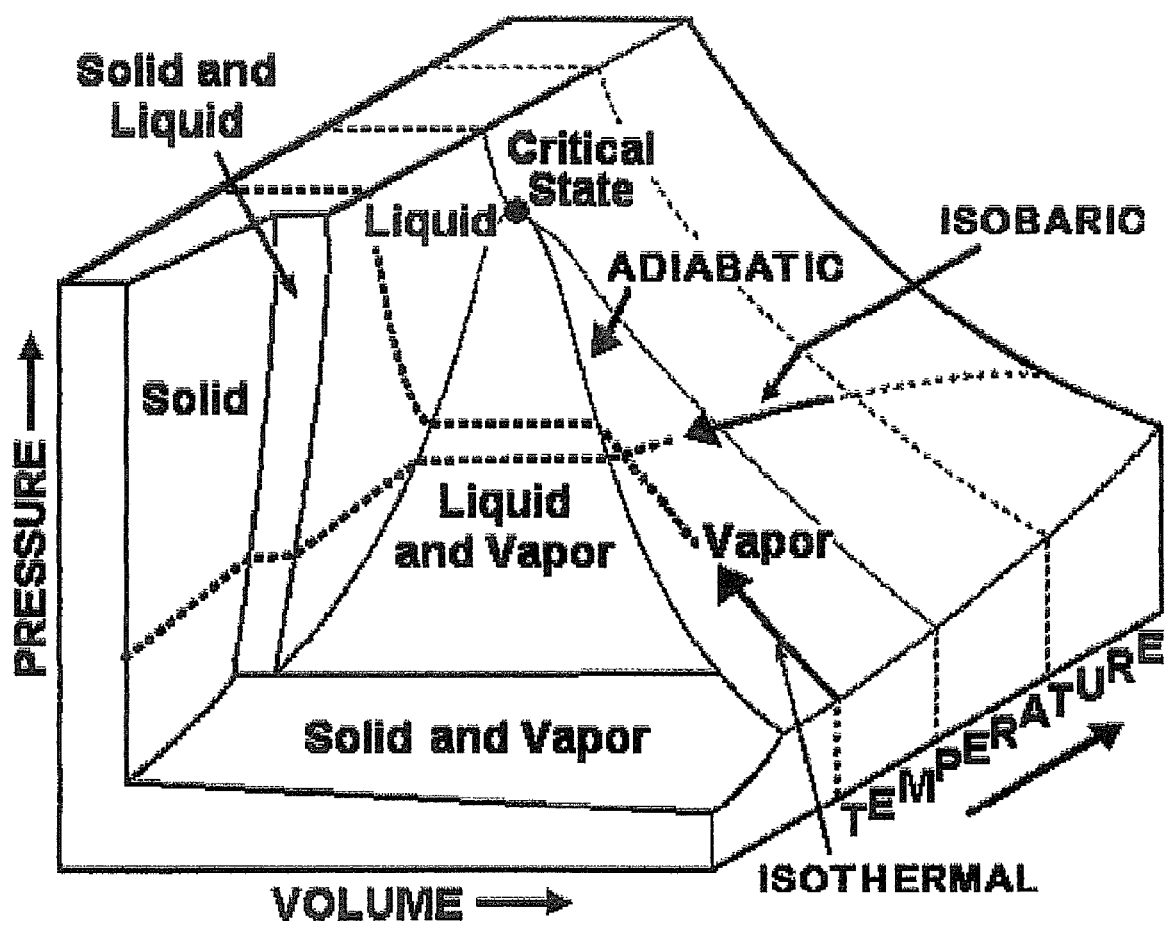
FIG. 5 is a perspective view of a three-dimensional representation illustrating solid, liquid and vapor states of substances as a function of thermodynamic state variables.

The present invention provides a method and an apparatus for harvesting latent energy and nonvaporous, that is, liquid and/or solid, water produced by state changes of water vapor present in atmospheric air. It is to be noted that, in the present specification, the term "atmospheric air" is intended to mean natural, ambient air that contains water vapor as one of its constituents. It is also to be noted that the term "extraction" refers to removing nonvaporous water to an internal water reservoir following a decompression process within an inventive apparatus and that the term "harvesting" refers to the removal and disposition of extracted nonvaporous water, air and energy when being separated from the apparatus following each complete processing cycle. As used in this document, the term "thermal energy" refers to potential and kinetic energies of random motions of atoms and molecules of a substance. "Thermodynamic free energy" denotes the total amount of energy in a physical system that can be converted to do work.

Latent heat of vaporization of water varies between 540 calories per gram at 100 degrees Celsius and 600 calories per gram at 0 degrees Celsius. It is absorbed by liquid water during its vaporization and released by water vapor during its condensation. Latent heat of sublimation varies between 600 calories per gram of water at 100 degrees Celsius and 680 calories per gram of water at 0 degrees Celsius. It is absorbed by ice when ice changes directly to water vapor (sublimates) and is released by water vapor when water vapor changes directly to ice (deposition).

An exemplary air mass 1000 meters in length, 1000 meters in width and 100 meters in depth exposes to the Sun an area of 1,000,000($10^6$) square meters and a total volume of 100,000,000($10^8$) cubic meters. FIG. 1 shows a model representing exemplary dimensions of such an air mass. In the language of physics, the term "power" specifically means energy transferred per unit time. The term is used in this document in this sense. For example, the latent energy harvested (transferred) from humid air per unit time can be appropriately referred to as "latent power." FIG. 2 is a graph illustrating the latent power potentially realizable by harvesting latent energy from water vapor in a particular volume of atmospheric air having these dimensions. This potential power (energy transferred per unit time) has been computed for the condensation of all water vapor within the particular volume of air, illustrated by FIG. 1, at ambient air pressure and for the ranges of temperature and relative humidity shown. The latent power associated with the condensation of water vapor at relative humidities of 50 percent and of 100 percent is shown to vary from approximately 1000 megawatts toward a value approaching 10 million megawatts over the nominal range of temperatures shown.

FIG. 3 is a graph illustrating the comparative power potentially realizable by harvesting energy converted from solar energy (radiant energy from the Sun) impinging on the same volume of atmospheric air as illustrated by FIG. 1. As shown, under optimum atmospheric conditions and orientation, the power contributed can be nearly 1000megawatts. Solar power is shown to vary from approximately 70 megawatts, under cloudy conditions, to more than 100 megawatts for horizontal surfaces. Were collection devices covering this total area oriented to face solar radiation directly, even more solar power could be extracted; however, the lowest values of latent power shown by FIG. 2 are comparable to the optimum solar power generated by collectors, all of which being oriented perpendicular to the sun's rays at ground level.

FIG. 4 is a graph illustrating the comparative power potentially realizable by harvesting kinetic energy from the same volume of atmospheric air moving at various velocities. As shown, the power contributed can be greater than 1000 megawatts. Values of latent power are shown for a wind speed of just 1 meter per second (2.24 mph), which corresponds to the lowest speed in the kinetic power graph of FIG. 4. As indicated, the latent power of a humid air mass is as much as 100 to 1000 times greater than its potential kinetic power.

In a comparison of the three types of environmental energy, FIGS. 2, 3 and 4 make evident the substantial amount of power potentially realizable by harvesting latent energy from water vapor in atmospheric air. The latent energy of water vapor at freezing temperature and only 50 percent relative humidity exceeds the average, climatological availability of solar radiation energy; and it is even competitive with solar energy harvested at optimum solar harvesting conditions. The latent energy of the water vapor in this cold, 50-percent-relative-humidity condition also exceeds the kinetic energy of wind over the range of wind speeds utilized by modern wind energy harvesting technology. At locations around the world having much higher atmospheric temperatures and relative humidities, the latent energy potentially available from water vapor is far greater than that available from solar and kinetic energy sources.

FIG. 5, which is similar to figures in many physics textbooks, is a three-dimensional model illustrating solid, liquid and vapor states of substances as a function of thermodynamic state variables, namely, temperature, pressure and volume. Frequently used methods for condensing a vapor and solidifying a liquid in an apparatus are isobaric cooling and isothermal compression; and these are indicated by specific process arrows. In these latter processes, desired state-changed materials are obtained, but energy released by molecules as they change state does not remain within a controlled volume of air and must be removed and discarded in a systematic manner for the controlled volume of air to follow the specified isobaric or isothermal process. In contrast, the process of the present invention decompresses a controlled volume of humid air until included water vapor reaches a saturated state. This is done with no exchange of energy with the external environment and is described as being an adiabatic decompression. As stated in the Summary of the Invention, those skilled in the art to which the present invention pertains will appreciate that, in practical applications, the term "adiabatic" is taken to mean nearly adiabatic.

The present process is represented in FIG. 5 as "adiabatic" decompression in contrast to the "isobaric" cooling and "isothermal" compression pathways to condensation shown in that figure. The process of the present invention specifies an adiabatic decompression process, wherein the energy released by water vapor as it changes state is not removed and discarded but remains within the controlled volume of the decompressed air. Both the state-changed water and the energy released by the state change are subsequently harvested following a recompression process as products of the present inventive process. Preferred processes for harvesting latent energy and nonvaporous water are illustrated by the logic flow diagram of FIG. 6 in conjunction with FIGS. 7, 8 and 9; and the processes will be detailed following a description of the three preferred embodiments illustrated by FIGS. 7, 8 and 9 and a description of process-supporting elements illustrated by FIGS. 10 through 13.

Figure 7:
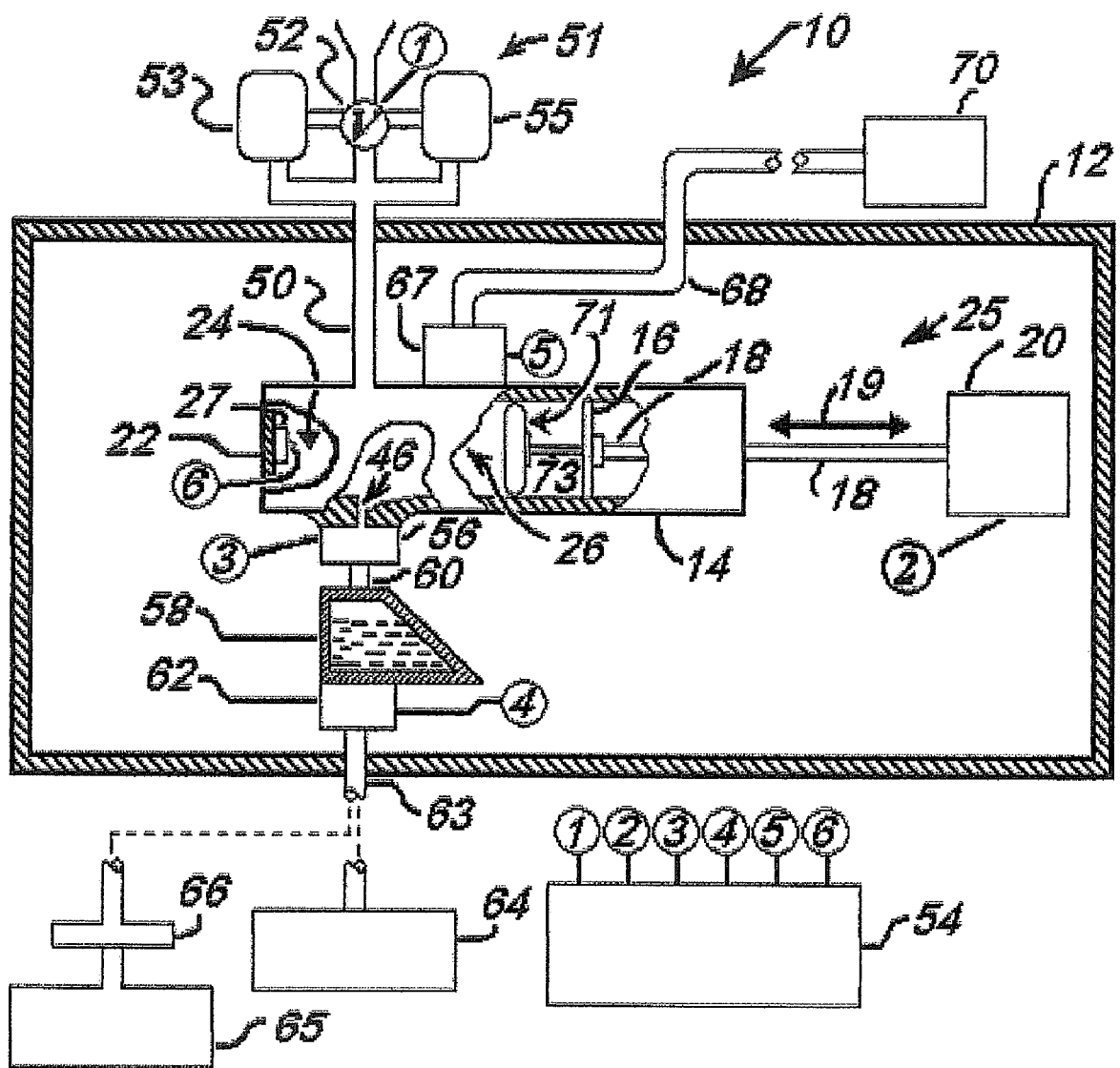
FIG. 7 is a side view, partially broken away, and partially in section, of an exemplary cylinder-piston mechanism for decompressing and recompressing a gas.

FIG. 7 is a schematic drawing, not drawn to scale, symbolically representative of elements of a preferred embodiment of an apparatus of the present invention, generally indicated by reference numeral 10. The apparatus 10 is a thermodynamically closed system that includes an insulated structure 12 to prevent the escape of thermal energy. It is to be noted that, in the interest of simplicity, the insulated structure 12 is shown schematically surrounding a space including a combination of apparatus components. As will be appreciated by those skilled in the art to which this invention pertains, insulation could alternatively be effectively disposed about individual components of the apparatus 10 that require insulation.

Figure 8:
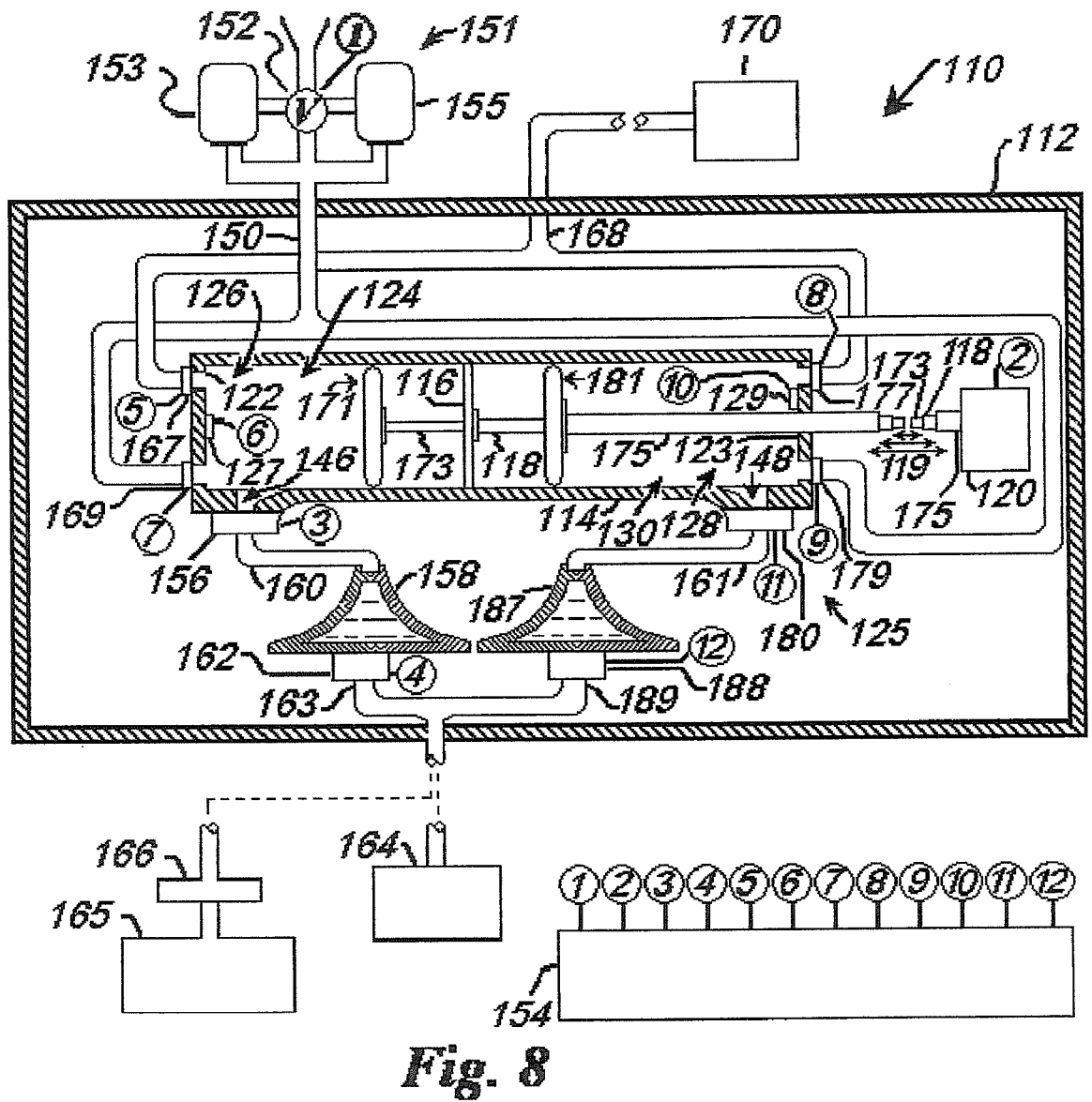
FIG. 8 is a side view, partially broken away, and partially in section, of an apparatus similar to that of FIG. 7 but providing a dual-phase process.
Figure 9:
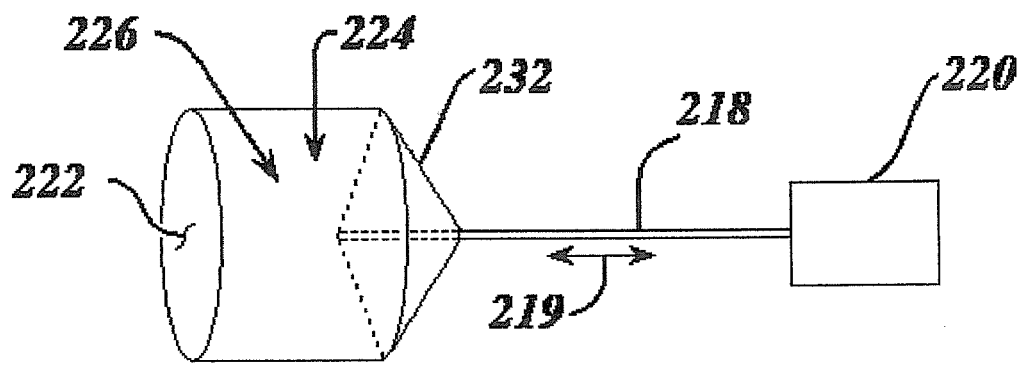
FIG. 9 is a transparent, perspective view of an exemplary closed chamber having a flexible diaphragm for decompressing and recompressing a gas.

In view of the basic functional similarities of the embodiments shown by FIGS. 7, 8 and 9, the most detailed description will be of the embodiment shown by FIG. 7. The apparatus 10 includes a hollow cylinder 14 within which is slidably disposed a piston 16 connected by a piston rod 18 to a driver 20, which translates the piston rod 18 and the piston 16 in opposite, rightward and leftward directions as indicated by a double-ended arrow 19. The driver 20 can include any of an applicable number of well-known devices (not shown) driven by hydraulic, pneumatic, cam, rack and pinion, ball screw, belt or chain mechanisms or by linear or rotary motors. The driver 20 also includes position sensors (not shown) for indicating driven element positions. The cylinder 14 has a closed end 22. A chamber, generally indicated by reference numeral 24, is defined as being within the cylinder 14 and between the closed end 22 and the piston 16. The chamber 24, piston 16, piston rod 18 and driver 20 comprise a decompression-recompression mechanism, generally indicated by reference numeral 25. A controllable volume, generally indicated by reference numeral 26, is defined, as is the chamber 24, as being within the cylinder 14 and between the closed end 22 and the piston 16. This volume is controlled by positioning the piston 16. It is to be understood that the hollow cylinder 14 is not necessarily limited to having a circular or, in some applications, even a symmetrical cross-section.

The chamber 24 is connected to atmospheric air via a thermally insulated air ingestion conduit 50; and air flow through the conduit 50 and into the chamber 24 is controlled by a controllable inlet, such as an air ingestion device, or valve, 52. Those skilled in the art to which the invention pertains will appreciate that, by definition, a valve is a device that controls the flow of a fluid. Valves include lids, plugs, and covers applied to openings so that, by their movements, such as by swinging, lifting and falling, sliding, turning, or the like, they open and close the openings to permit or prevent passage by such as fluids. Modern valves can control not only the flow but also the pressure, rate, volume, and direction of liquids, gases, slurries and even dry materials through a pipeline, flume, chute or similar passageway. They can turn on and off, regulate, modulate and isolate; can range in size from a fraction of an inch to some 30 feet in diameter; and can vary considerably in complexity.

FIG. 7 shows a symbolic representation of an air pretreatment system, generally indicated by reference numeral 51, which includes the air ingestion valve 52, an air prewarming device 53, and an air prehumidifying device 55. The air ingestion valve 52 is shown as one multifunctional valve capable of routing incoming, atmospheric air directly into the chamber 24. Alternatively, it is also capable of routing incoming, atmospheric air through the air prewarming device 53, through the air prehumidifying device 55, or through both devices, 53 and 55, before routing atmospheric air into the chamber 24. Those skilled in the art to which the invention pertains will appreciate that separate valves (not shown) can also be used for thus routing atmospheric air into the chamber 24. Each of the three alternatives result in available external energy being added to latent energy of the ambient atmospheric air before ingestion. Examples of available external energy sources include solar radiation, a hot engine manifold, hot flue gases passing through an industrial plant, steam exhausting from a power plant, and the like.

An apparatus controller 54 is shown by FIG. 7 as having symbolic terminals, represented by circled numerals 1 through 6, that communicate with like-identified terminals of the apparatus 10. As shown, the air ingestion valve 52 is connected to and controlled by the apparatus controller 54 via connections between terminals that are each represented by a circled numeral 1. The driver 20 positions the piston 16 under control of the apparatus controller 54 via connections between terminals that are each represented by a circled numeral 2.

A nonvaporous water extracting valve 56 extracts nonvaporous water from the chamber 24 under control of the apparatus controller 54 via connections between terminals that are each represented by a circled numeral 3. An insulated, internal water reservoir 58 receives, via a thermally insulated conduit 60, and retains the nonvaporous water within the apparatus 10 prior to the water being harvested for external use. It is important to note that extracting the water and necessitating that it be held in the internal reservoir 58, separated from but at the same pressure as the controlled volume of air 26 in the chamber 24, renders the process of latent heat release nearly irreversible.

As shown by FIG. 7, to minimize evaporation, the internal water reservoir 58 is slopingly configured so that the upper surface area of retained water is much smaller than the summative surface area of all water droplets within the controlled volume of air. Rather than being linearly sloped as shown by FIG. 7, the internal water reservoir 58 can also be concavely configured, as shown by FIG. 8, for the same reason. The dimensions of the conduit 60 between the chamber 24 and the internal reservoir 58 are also kept as small as possible to minimize the volume of air located outside the chamber 24 and to minimize evaporation. Also, the operation of the nonvaporous water extracting valve 56 is coordinated with that of the external air ingestion valve 52 for the same reason. Additionally, the nonvaporous water extracting valve 56 is controlled to maintain nonvaporous water within the internal water reservoir 58 and the conduit 60 at maximum possible levels to minimize the amount of air contained therewithin and not within the chamber 24, where nonvaporous water is subject to removal by a water removal device, a generic representation of which is generally indicated by reference numeral 71. It is the possibility of there being a minimal amount of water, remaining in a conduit or valve, that could be evaporated during subsequent decompression processes that encourages the use of the word "nearly" in the foregoing term "nearly irreversible."

The chamber 24 of the cylinder 14 has a drain channel, generally indicated by reference numeral 46, which is shown in exaggerated scale, to receive and direct nonvaporous water within the chamber 24 to the nonvaporous water extracting valve 56. The piston rod 18 has a configuration of an elongate, hollow tube. A water droplet removal device driver rod 73 coaxially and slidably extends through the piston rod 18 and is operatively connected between the water droplet removal device 71 and the driver 20. The driver 20 translates the water droplet removal device rod 73 and the water droplet removal device 71 in rightward and leftward directions, independently of the piston rod 18 and of the piston 16, to transfer water condensed and coalesced on the water droplet removal device 71 and on the interior surface of the chamber 24 toward the drain channel 46 for subsequent extraction.

A nonvaporous water harvesting valve 62 harvests the nonvaporous water from the internal water reservoir 58, via a thermally insulated conduit 63, to an external water reservoir 64 of the apparatus 10. The nonvaporous water harvesting valve 62 is under control of the apparatus controller 54 via connections between terminals that are each represented by a circled numeral 4. If the apparatus 10 is located in suitable terrain, an extra, or alternate, low-level, external water reservoir 65 can be located at an elevation lower than that of the internal water reservoir 58. An energy-harvesting device, such as a water-turbine-driven electric generator 66, can then be positioned proximate the low-level, external water reservoir 65 to harvest energy derived from water flowing, under the influence of gravity, from the internal reservoir 58 to the low-level, external water reservoir 65. This alternate arrangement is also illustrated by FIG. 7, the alternate paths of water flow being indicated by dashed lines.

An air harvesting valve 67 harvests warmed, recompressed air from the chamber 24, via a thermally insulated conduit 68, to a thermal energy harvesting device 70 external to the thermally isolated apparatus 10. The air harvesting valve 67 is under control of the apparatus controller 54 via connections between terminals that are each represented by a circled numeral 5. A pressure sensor 27 is mounted within the chamber 24 to measure pressure within the chamber 24 and to send a signal representative of the pressure to the apparatus controller 54 via connections between terminals that are each represented by a circled numeral 6. It is to be noted that chamber pressure can be estimated from data indicating the location at which the driver 20 positions the piston 16.

FIG. 8 is a schematic drawing, not drawn to scale, symbolically representative of an apparatus, generally indicated by reference numeral 110, of another preferred embodiment of the present invention. Like the apparatus 10 shown by FIG. 7, the apparatus 110 is a closed system that includes an insulated structure 112 to prevent the escape of thermal energy. As in FIG. 7, and for the same reason, the insulated structure 12 is shown schematically surrounding a space including a combination of apparatus components.

The apparatus 110 is similar to the cylinder-piston apparatus 10 shown by FIG. 7 but includes, in a common cylinder 114, a first chamber, generally indicated by reference numeral 124, and a second chamber, generally indicated by reference numeral 128. The first and second chambers 124 and 128 have longitudinal axes that are collinear. The cylinder 114 has a first closed end 122 and a second closed end 123. The two chambers are operated in an oppositely phased manner by a common piston 116 that is slidably disposed within the cylinder 114. The first chamber 124 is defined as being within the cylinder 114 and between the first closed end 122 and the piston 116, and the second chamber 128 is defined as being between the second closed end 123 and the piston 116. The piston 116 is connected by a piston rod 118 to a driver 120, which translates the piston rod 118 and the piston 116 in rightward and leftward directions as indicated by a midlength one of three double-ended arrows 119. As mentioned in the description of FIG. 7, the driver 120 can include any of an applicable number of well-known devices (not shown) driven by hydraulic, pneumatic, cam, rack and pinion, ball screw, belt or chain mechanisms or the like or by linear or rotary motors. It also includes position sensors (not shown) for indicating driven element positions.

As similarly illustrated by FIG. 7, FIG. 8 shows a symbolic representation of an air pretreatment system, generally indicated by reference numeral 151, which includes an air ingestion device, or valve, 152, an air prewarming device 153, and an air prehumidifying device 155. The air ingestion valve 152, which controls the admission of atmospheric air through a thermally insulated air ingestion conduit 150, is shown as one multifunctional valve capable of routing incoming, atmospheric air directly into the chambers 124 and 128. Alternatively, it is also capable of routing incoming, atmospheric air through an air prewarming device 153, through an air prehumidifying device 155, or through both devices, 153 and 155, before routing atmospheric air into the chamber 124 and 128. Also, as previously mentioned in the description of FIG. 7, those skilled in the art to which the invention pertains will appreciate that separate valves (not shown) can also be used for thus routing atmospheric air into the chambers 124 and 128. Again, each of the three alternatives result in available external energy being added to latent energy of the ambient atmospheric air before ingestion.

An apparatus controller 154 is shown by FIG. 8 as having symbolic terminals, generally indicated by circled numerals 1 through 12, that communicate with like-identified terminals of the apparatus 110. As shown, the air ingestion valve 152 is connected to and controlled by the apparatus controller 154 via connections between terminals that are each represented by a circled numeral 1. The driver 120 positions the piston 116 under control of the apparatus controller 154 via connections between terminals that are each represented by a circled numeral 2.

The chambers 124 and 128, piston 116, piston rod 118 and driver 120 comprise a decompression-recompression mechanism, generally indicated by reference numeral 125. Controllable volumes, generally indicated by reference numerals 126 and 130, are defined within the chamber 124 as being within the cylinder 114 and between the closed end 122 and the piston 116 and within the chamber 128 as being within the cylinder 114 and between the closed end 123 and the piston 116, respectively. The controllable volumes 126 and 130 are controlled by positioning the piston 116. The decompression and recompression cycles within the two chambers, 124 and 128, respectively, are 180 degrees out of phase. As air in one chamber is being decompressed, air in the other is being recompressed. As is the case with the apparatus shown by FIG. 7, it is to be understood that the hollow cylinder 114 is not necessarily limited to having a circular or, in some applications, even a symmetrical cross-section.

First and second internal air ingestion valves 169 and 179 control the ingestion of air, from the thermally insulated conduit 150 to the first and second chambers 124 and 128, under control of the apparatus controller 154 via connections between terminals that are represented by circled numerals 7 and 9, respectively. First and second nonvaporous water extracting valves 156 and 180 extract nonvaporous water from the first and second chambers 124 and 128, via thermally insulated conduits 160 and 161, to internal water reservoirs 158 and 187 under control of the apparatus controller 154, via connections between terminals that are represented by circled numerals 3 and 11, respectively.

As shown by FIG. 8, to minimize evaporation, the internal water reservoirs 158 and 187 are concavely configured so that the upper surface area of retained water is much smaller than the summative surface area of all water droplets within the controlled air. The internal water reservoirs 158 and 187 could also be slopingly configured, as shown by FIG. 7, for the same reason. The dimensions of the conduits 160 and 161 between the chambers 124 and 128, respectively, and the internal reservoirs 158 and 187 are also kept as small as possible to minimize evaporation; and the operations of the nonvaporous water extracting valves 156 and 180 are coordinated with that of the external air ingestion valve 152 for the same reason. Additionally, the first and second nonvaporous water extracting valves 156 and 180, respectively, are controlled to maintain nonvaporous water within the internal water reservoirs 158 and 187 and the conduits 160 and 161 at maximum possible levels. This minimizes the amount of air contained therewithin and not within the first and second chambers 124 and 128, respectively, where nonvaporous water is subject to removal by first and second water removal devices, generally indicated by reference numerals 171 and 181, respectively.

The first and second chambers 124 and 128 of the cylinder 114 have first and second drain channels, generally indicated by reference numerals 146 and 148, respectively, which are shown in exaggerated scale, to receive and direct nonvaporous water from the first and second chambers 124 and 128, respectively, to the first and second nonvaporous water extracting valves 156 and 180, respectively. The piston rod 118 has a configuration of an elongate, hollow tube. A first water droplet removal device driver rod 173 coaxially and slidably extends through the piston rod 118 and is operatively connected between the first water droplet removal device 171 and the driver 120. A second water droplet removal device driver rod 175 also has a configuration of an elongate, hollow tube. The piston rod 118 coaxially and slidably extends through the hollow second water droplet removal device driver rod 175 and is operatively connected between the second water droplet removal device 181 and the driver 120. The driver 120 translates the first and second water droplet removal device rods 173 and 175, and therefore the first and second water droplet removal devices 171 and 181, respectively, in opposite, rightward and leftward directions, as indicated by the shortest and longest ones, respectively, of the three double-ended arrows 119. The first and second water droplet removal devices 171 and 181, respectively, move independently of the piston 116 and of each other to transfer water condensed and coalesced on the water droplet removal device 71 and on the interior surfaces of the first and second chambers 124 and 128 toward the first and second drain channels 146 and 148 for subsequent extraction.

Nonvaporous water harvesting valves 162 and 168 harvest nonvaporous water, from the internal water reservoirs 158 and 187 via thermally insulated conduits 163 and 189 to an external water reservoir 164, under control of the apparatus controller 154 via connections between terminals each represented by circled numbers 4 and 12. If the apparatus 110 is located in suitable terrain, an extra or alternate, low-level, external water reservoir 165 can be located at an elevation lower than that of the internal water reservoir 158. An energy-harvesting device, such as a water-turbine-driven electric generator 166, can then be positioned proximate the low-level, external water reservoir 165 to harvest energy derived from water flowing, under the influence of gravity, from the first and second internal reservoirs 158 and 187 to the low-level, external water reservoir 165. This alternate arrangement is also illustrated by FIG. 8, the alternate paths of water flow being indicated by dashed lines.

First and second air harvesting valves 167 and 177 harvest air, from the first and second chambers 124 and 128 via a thermally insulated conduit 168 to a thermal energy harvesting device 170, under control of the apparatus controller 154 via connections between terminals that are represented by circled numerals 5 and 8, respectively. First and second pressure gauges 127 and 129 send signals representative of pressures in the chambers 124 and 128 to the apparatus controller 154 via connections between terminals that are represented by circled numbers 6 and 10, respectively. It is to be noted that chamber pressures can be estimated from data indicating the locations at which the driver 120 positions the piston 116.

Decompression and recompression can be accomplished by using a number of apparatuses and methods. For example, as an alternative preferred embodiment to that of the cylinder-piston mechanism shown by FIG. 7, FIG. 9, not drawn to scale, shows a transparent, perspective view of a closed chamber, generally indicated by reference numeral 224, having a closed end 222 and a flexible diaphragm 232 at opposite ends of the chamber 224. A controllable volume, generally indicated by reference numeral 226, is defined as being within the chamber 224 and between the closed end 222 and the flexible diaphragm 232. The controllable volume 226 is controlled by the position of the flexible diaphragm 232, which is connected to a driver 220 by a diaphragm rod 218, which is driven in rightward and leftward directions as indicated by a double-ended arrow 219. Although the chamber 224 is shown having a circular cylindrical shape, it could have almost any fixed configuration. Although not shown in the representative FIG. 9, as with the chamber 24 shown by FIG. 7, the chamber 224 would also have an air pretreatment system, an air harvesting valve, a water extracting valve and a water removal device. The flexible diaphragm 232 would basically perform the same function as the piston 16 shown by FIG. 7. The operation of the valves and water removal devices would also be as previously described for the similar elements shown by FIG. 7.

As in the case of the apparatus 110 shown by FIG. 8, where a common piston 116 and a pair of oppositely disposed and operated chambers 124 and 128 are used to perform a pair of decompression and recompression operations that are 180 degrees out of phase with each other, an alternative preferred embodiment (not shown) to that shown by FIG. 8 could use the flexible diaphragm 232 in common with a pair of oppositely disposed and operated chambers 224, shown by FIG. 9, to perform similar decompression and recompression operations that are 180 degrees out of phase with each other. Although not shown, as with the second chamber 128 shown by FIG. 8, the additional chamber would also have an air ingestion valve, an air harvesting valve, a water extracting valve and a water removal device. The common flexible diaphragm 232 would basically perform the same function as the common piston 116 shown by FIG. 8. The operation of the valves and water removal devices would also be as previously described for the similar elements shown by FIG. 8.

It is to be noted that other alternative embodiments could be substituted for those shown by FIGS. 7 through 9. An example (not shown) would combine a plurality of thermally insulated chambers and operationally supporting elements similar to those shown by FIGS. 7 and 8. Separate longitudinal axes, each passing through at least one chamber, would extend radially from a common, central driver.

Figure 10:
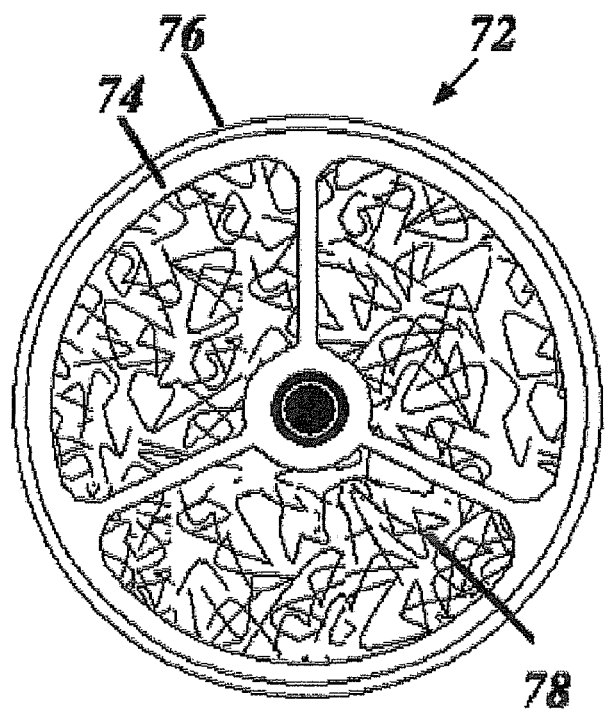
FIG. 10 is a front view of a water droplet removal filter.
Figure 11:
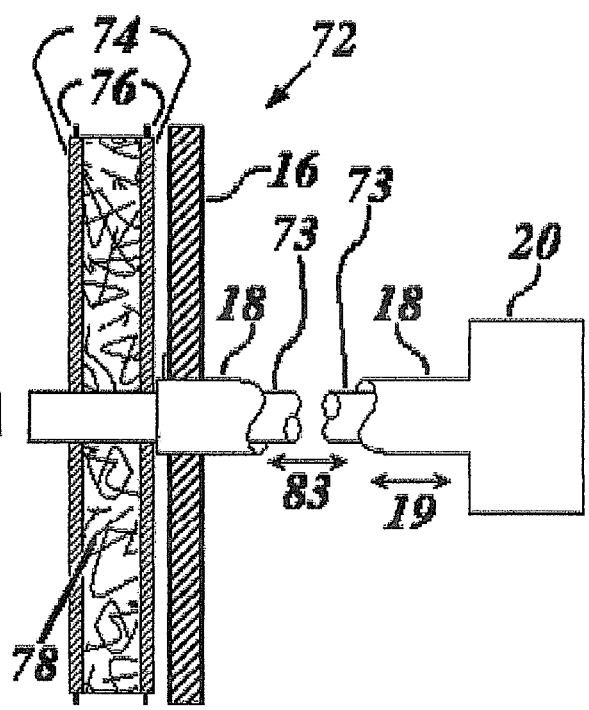
FIG. 11 is a side view of the water droplet removal filter of FIG. 10.

As shown by FIGS. 10 and 11, one species of the generic water droplet removal device 71 shown by FIG. 7 (and devices 171 and 181 as shown by FIG. 8), namely, a water droplet removal filter, generally indicated by reference numeral 72, is disposed within the chamber 24 (or within the chambers 124 and 128 as shown by FIG. 8) such that there is relative motion between the filter 72 and the controlled air. An analogy to water extraction using filter fibers is the familiar experience of water vapor from exhaled air condensing upon fibers of a ski mask or scarf as exhaled air passes between them. In the present device, water droplets collect and coalesce upon fibers 78 of the filter 72. Resulting liquid water descends and runs downwardly under the influence of gravity, pools in the lower portion of the chamber 24 (or the chambers 124 and 128 as shown by FIG. 8), and is extracted via the water extracting valve 56 (or the water extracting valves 156 and 180 as shown by FIG. 8) under control of the apparatus controller 54. Although the filter 72 is shown and described as having fibers 78, it is to be understood that it could also have any of a number of other filter elements capable of condensing and coalescing water droplets upon their surfaces.

As shown by FIG. 7, and as previously described, the piston rod 18 of the apparatus 10 is centrally connected to the piston 16; and both are translatable by the driver 20 in rightward and leftward directions, as indicated by the double-ended arrow 19, to decompress and recompress, respectively, controlled air within the chamber 24 (or within the chambers 124 and 128 as shown by FIG. 8). FIGS. 10 and 11, respectively, show front and side views of the water droplet removal filter 72, which includes a filter holder 74 that supports the filter fibers 78. The water droplet removal device driver rod 73 is centrally connected to the filter holder 74, and both are translatable by the driver 20 in rightward and leftward directions as indicated by a double-ended arrow 83. The filter holder 74 can be translated independently of the piston 16, provided the position of the piston 16 allows sufficient space for the filter holder 74 to do so, to produce relative motion between the water droplet removal filter 72 and the controlled air.

The filter holder 74 is configured to fit slidably within the chamber 24, and a resilient ring 76 is mounted peripherally around the filter holder 74. The water droplet removal filter 72 transfers water condensed and coalesced on the filter 72, and the resilient ring 76 wipes water condensed and coalesced on the interior surface of the chamber 24, toward the drain channel of the cylinder 14 for subsequent extraction. Since the filter holder 74 can be moved independently of the piston 16, the latter can be held motionless until a desired percentage of water droplets has been removed by the water droplet removal filter 72 from the controlled air and transferred to the closed end 22 of the cylinder 14. A specification of a desired percentage of water droplet removal would be based on an optimization of overall productivity of energy and water extraction per unit time in relation to the time spent for each machine cycle and the work performed during decompression and water removal. This means that the desired percentage is a variable based on the desired operating parameters and existing weather conditions.

Figure 12:
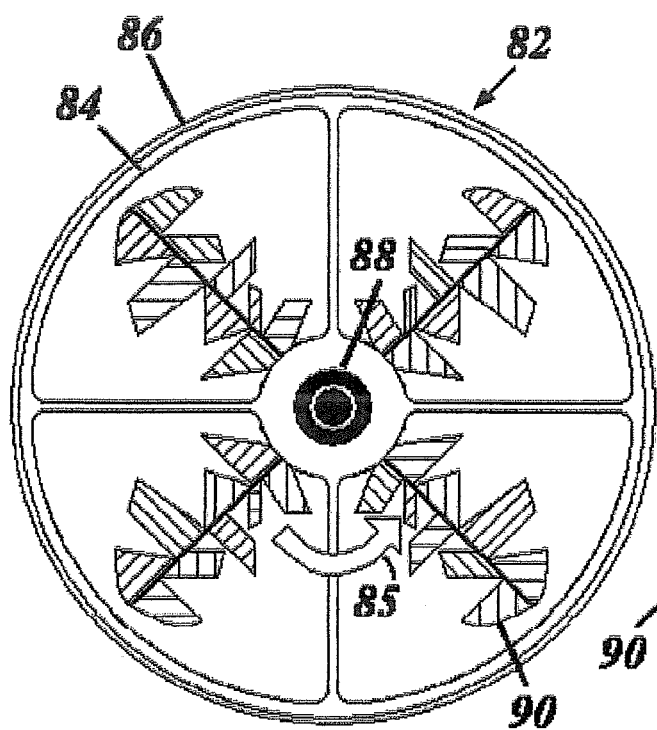
FIG. 12 is a front view of a water droplet removal fan.
Figure 13:
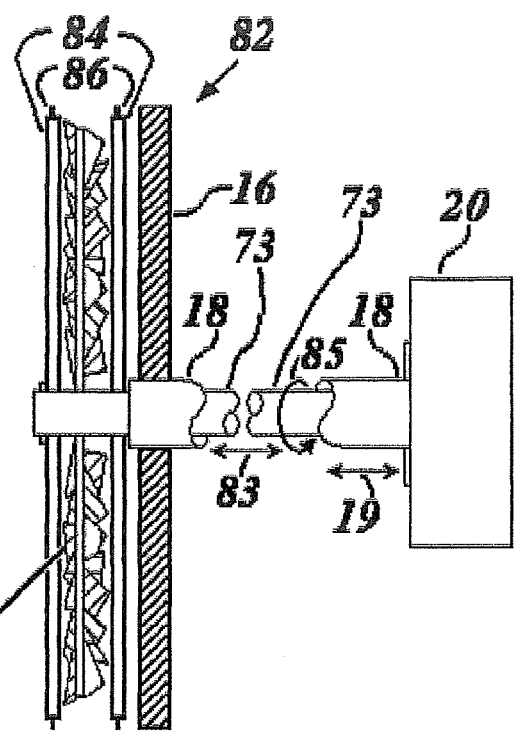
FIG. 13 is a side view of the water droplet removal fan of FIG. 12.

FIGS. 12 and 13 respectively illustrate another species of the generic water droplet removal device 71 shown by FIG. 7 (and devices 171 and 181 as shown by FIG. 8), namely, a water droplet removal fan, generally indicated by reference numeral 82. FIGS. 12 and 13 respectively show front and side views of the water droplet removal fan 82, which includes a fan holder 84. A hub 88 is centrally and rotatably supported by the fan holder 84, and at least one fan blade 90, four being shown by FIG. 12, radially extends from the hub 88. The water droplet removal device rod 73 is centrally connected to the hub 88. Both are axially moved by the driver 20 in rightward and leftward directions as indicated by the double-ended arrow 83, and the water droplet removal device rod 73 can also be rotated by the driver 20 as indicated by a circular arrow 85. The hub 88 can be rotated and axially moved independently of the piston 16 provided the position of the piston 16 allows sufficient space for the hub 88 to do so.

The fan 82 creates a turbulence in the air that impels water droplets to collide with each other and to condense, impact and coalesce, and perhaps impel some water vapor to deposit, upon the inner surface of the chamber 24 (or the chambers 124 and 128 as shown by FIG. 8). The pitch of a conventional propeller blade generally decreases smoothly with distance from the blade's axis of revolution, and such blades would produce a relatively smooth flow of air and water droplets. Note, however, that the pitch of the blades 90 of the fan 82 undergoes numerous, abrupt transitions to create brutally forceful turbulence that causes water droplets to collide with the blades 90, with each other, and with the inner surface of the chamber 24 (or the chambers 124 and 128 as shown by FIG. 8) and to coalesce and descend to the lower, inner surface of the chamber 24 (or the chambers 124 and 128 as shown by FIG. 8).

The fan holder 84 is configured to fit slidably within the chamber 24 (or the chambers 124 and 128 as shown by FIG. 8), and a resilient ring 86 is mounted peripherally around the fan holder 84. The fan holder 84 transfers water condensed and coalesced on the fan 82, and the resilient ring 86 wipes water condensed and coalesced on the interior surface of the chamber 24 (or chambers 124 and 128 as shown by FIG. 8) toward the drain channel 46 (or the drain channels 146 and 148 as shown by FIG. 8) of the cylinder 14 (or the cylinder 114 as shown by FIG. 8) for subsequent extraction. As with the filter 72, since the fan hub 88 can be moved independently of the piston 16 (or 116 as shown by FIG. 8), the latter can be held motionless until a desired percentage of water droplets has been removed by the water droplet removal fan 82 from the controlled air and transferred to the drain channel 46 (or the drain channels 146 and 148 as shown by FIG. 8) of the cylinder 14 (or the cylinder 114 as shown by FIG. 8) for subsequent extraction. Although the water droplet removal filter 72, shown by FIGS. 10 and 11, and fan 82, shown by FIGS. 12 and 13, have been described as they would be used with the apparatuses shown by FIGS. 7 and 8, it is to be understood that they could also be similarly used in the apparatuses shown by FIG. 9.

Figure 6:
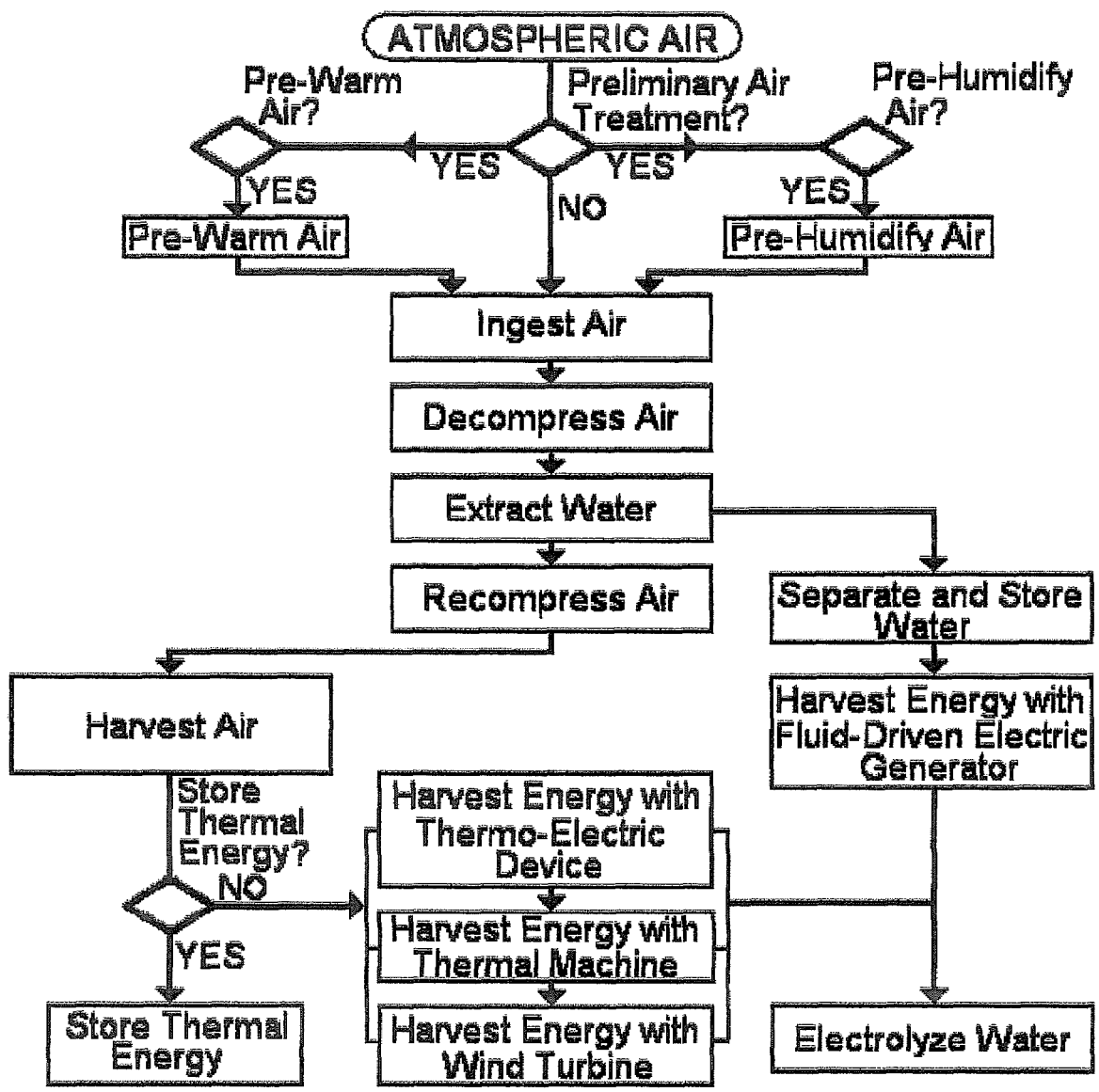
FIG. 6 is a logic flow diagram of a process to harvest latent energy and nonvaporous water from a gaseous mixture.

As previously mentioned, the logic flow diagram of FIG. 6 illustrates a preferred process of the present invention for harvesting latent energy and nonvaporous water from a gaseous mixture. In the interest of brevity, except as otherwise indicated, the process steps will primarily be described with respect to the mechanism shown by FIG. 7, which is functionally representative of the other embodiments. As shown, in a first process step, a particular amount of atmospheric air is ingested into the controllable volume 26 of the apparatus 10. This is initiated by the opening of the air ingestion valve 52 and of the rightward movement of the piston 16 within the cylinder 14 under urging of the driver 20. Both actions are controlled by the apparatus controller 54, which also closes the air ingestion valve 52 when a particular volume of air has been ingested into the chamber 24.

In a first of three previously described alternatives, pre-ingested, atmospheric air is warmed using available energy collected externally to the apparatus 10, for example, as illustrated by FIG. 1 to increase the ingested thermal energy of the thermodynamic process. In a second of the three alternatives, water vaporized using available energy collected externally to the apparatus 10 is introduced into pre-ingested, atmospheric air. In a third of the three alternatives, pre-ingested, atmospheric air is warmed; and vaporized water is also introduced into it.

Figure 14:
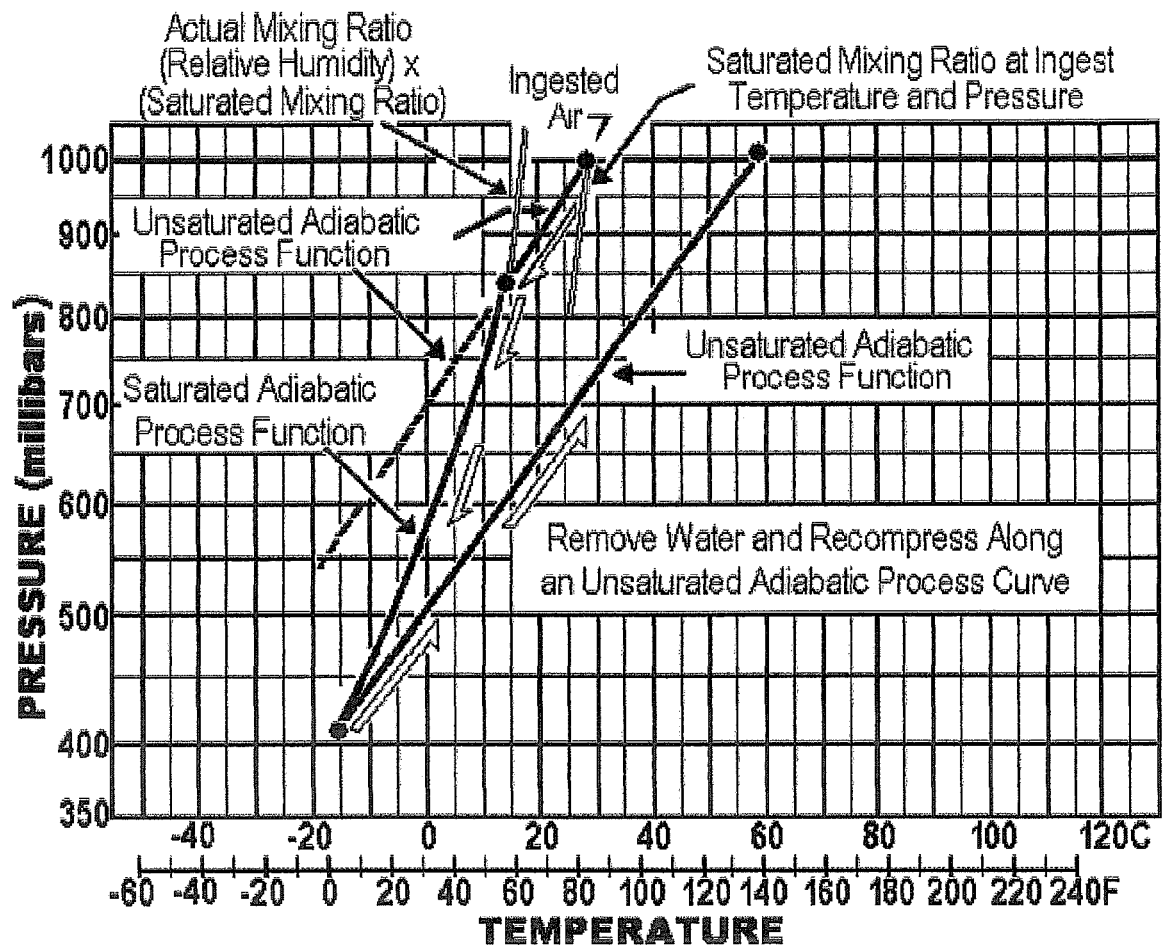
FIG. 14 is a graph illustrating the relationship of temperature and pressure during an adiabatic decompression of atmospheric air, a removal of nonvaporous water, and a subsequent adiabatic recompression of the air, which then contains latent heat of condensation.
Figure 15:
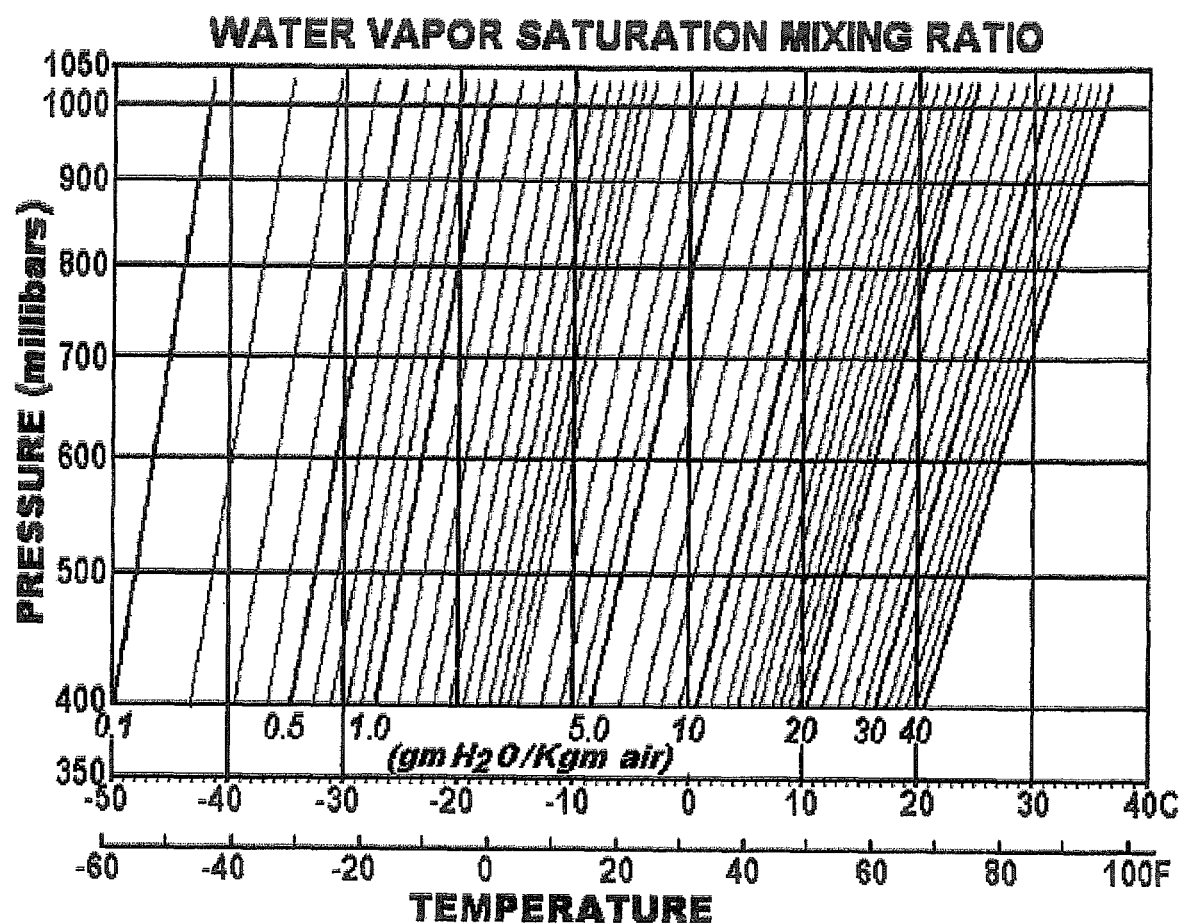
FIG. 15 is a graph illustrating mixing ratios of saturated air as functions of temperature and pressure.

In a second process step, following its ingestion into the controllable volume 26 within the apparatus 10, the ingested air is controllably decompressed so that it has a greater volume and thus a lower density. The decompression is performed such that little or no energy is exchanged between the decompressing air and the external environment; that is, the decompression is performed nearly adiabatically. As the adiabatic decompression progresses, the partial pressure of the water vapor decreases toward a saturation vapor pressure, where the water vapor condenses to a liquid state, a portion of the water vapor possibly also depositing to a solid state. The decompressing air thus includes, as constituents, a mixture of water vapor, liquid water and, possibly, solid water. The change of state of water is attended by a release of latent energy that is added to the overall internal energy of the decompressed air. FIG. 14 is a graphic representation of the relationship of temperature and pressure during an adiabatic decompression of atmospheric air, a removal of nonvaporous water, and a subsequent adiabatic recompression of the air, which then contains latent heat of condensation. FIG. 15 is a graphic representation of mixing ratios of saturated air as functions of temperature and pressure.

In a third process step, during decompression and/or at the point of maximum decompression, a fraction greater than zero and less than one of nonvaporous water in the decompressed air is extracted. At this point in the process, the fractional portions of the liquid and any solid water are retained in a separate, internal water reservoir 58 within the apparatus 10, as shown by FIG. 7, prior to being harvested for external use. Since the internal energy of the nonvaporous water is extracted from the system as the water is extracted, the process is slightly nonadiabatic, but the internal energy of removed nonvaporous water is small in comparison to the internal energy of the air being processed. This process involves no significant change in pressure or temperature and is therefore represented as occurring at coincident points 4 and 5 (indicating the lowest pressure to which the controlled air is decompressed and indicating the condition of controlled air after all nonvaporous water has been removed, respectively, in FIGS. 16 and 19).

In a fourth process step, after the fractional portions of the nonvaporous water have been extracted and placed in the internal reservoir, the remaining decompressed air is recompressed adiabatically toward the pressure it had when initially ingested. Recompression can be terminated when the pressure of the recompressing air reaches that of the initial controlled volume of air. Recompression can also be terminated when the volume of the recompressing air reaches that of the initial controlled volume of air. In the latter case, for thermodynamic reasons, the final pressure will be higher than the initial ingestion pressure. Additionally, recompression can be terminated when the pressure and the volume of the recompressing air are at any state along an unsaturated adiabat between a point where the pressure of the recompressing air reaches that of the initial controlled volume of air and a point where the volume of the recompressing air reaches that of the initial controlled volume of air. Actually, as a practical matter, recompression can be terminated when pressure and volume of the recompressing air are at any state along an unsaturated, recompression adiabat by opening the air harvesting valve 67.

In a fifth process step, with the final thermodynamic conditions being as described, the recompressed air is harvested from the chamber 24 containing the controllable volume 26 of FIG. 7. The recompressed air is then conducted through the conduit 68 to the external thermal energy harvesting device 70 to harvest the increased internal energy of the recompressed air. The final condition of the recompressed air has temperature, and possibly pressure, exceeding that of the initial, atmospheric air. As desired and appropriate, the thermal energy of the harvested air can be retained for use at a later time. For example, the thermodynamic free energy can be used to change the state of a working material, the stored energy being released when the working material is allowed to change back to its initial state. A working material commonly used in this process is paraffin wax.

Alternately, the thermal energy of the harvested air can be immediately harvested by one or more methods that operate on differences between harvested air temperature and pressure and atmospheric air temperature and pressure. Harvesting increased internal energy, and energy derived from the pressure difference, can be accomplished by any of several means. Thermal energy and pressure differences between harvested air and atmospheric air can be used to drive thermodynamic pumps and engines. Temperature differences between the harvested air and external, atmospheric air can be used to convert thermal energy to electric energy by using thermoelectric generators such as thermocouples, thermoelectric thin films on silicon, and the like. The temperature differences can also be used to convert thermal energy to mechanical energy by using a thermal engine such as a Stirling engine. Temperature and pressure differences between harvested air and atmospheric air can also be used to convert thermal energy to electric energy by using a convection device such as a vertically oriented, wind-turbine-driven electric generator 66.

In a sixth process step, which can be performed before, after, or simultaneously with, the fifth process step, the nonvaporous water harvesting valve 62, shown by FIG. 7, is opened, releasing nonvaporous water that was extracted from initially ingested, atmospheric air and retained in the internal water reservoir 58 of the apparatus 10. The released nonvaporous water passes through the conduit 63 and into the external water reservoir 64 at environmental conditions and at or near the altitude of the internal water reservoir 58. Alternatively, and as desired and appropriate, the nonvaporous water can be released into a flume or conduit that, under the influence of gravity, conducts the water to a lower altitude to facilitate harvesting potential energy possessed by virtue of the relatively elevated initial position of the nonvaporous water. As indicated by FIG. 7, the potential energy can be harvested as descending water is conducted through the turbogenerator 66 before reaching the external, low-level water reservoir 65. The harvested potential energy can be added to the energy gained by harvesting latent energy. It is noteworthy that the third process step, which performs a required extraction of nonvaporous water from the decompressed air, also provides potable water by harvesting the water from atmospheric air by taking advantage of a latent change of state rather than a chemical process.

As a result of the nonvaporous water extraction, the total remaining mass of nonvaporous water within the air is substantially less than the total mass of water vapor that was condensed and possibly deposited during the decompression process. The portion of the increased internal energy involved in returning the remaining nonvaporous water to water vapor is, therefore, likewise substantially less than the total internal energy that was increased during the decompression process. The internal energy of the recompressed air is thus significantly higher than was the internal energy of the initially ingested air. Depending on operational specifications of conditions at which the recompression is to be terminated, the pressure of the recompressed air could also be significantly higher than was the pressure of the initially ingested air.

The physical process, and its options, described by the foregoing may be categorized as harvesting latent energy of humid air by forced condensation or crystallization, thereby adding a portion of the energy released by water vapor molecules, as they condense and possibly deposit, to the internal thermal energy in the controlled air. According to the first law of thermodynamics, energy added to a gaseous system is accounted for by the sum of the increase in the internal energy of the system and the work done by the system. It is convenient to describe this in terms of energy and work per unit mass of the gaseous system. The change in internal energy of the gaseous system per unit mass can be specified in two parts: the change in energy per unit mass of the portion of the gas that does not change state (that is, does not condense or deposit); and the change in energy per unit mass of the portion of the gas that does change state by condensing to a liquid state and possibly depositing to a solid state.

The first of these two contributions to changes of internal energy can be conveniently expressed as the product of the mass-specific heat capacity of air at constant volume multiplied by the change in temperature of the gas mixture as it undergoes the thermodynamic process. The second contribution to change in internal energy can be expressed as the product of the latent heat of condensation, or sublimation, if appropriate, for the gaseous constituent that condenses multiplied by the mass of that constituent that is condensed per unit mass of the gaseous system. The work per unit mass done by the gaseous system is expressed as being the product of the pressure of the gas mixture and the change in volume per unit mass. All these quantities refer to a process underway. In differential-equation form, the process can be expressed in terms of the first law of thermodynamics as:

$$dq=cdT+Ldm+pda,$$

where $dq$ is the energy added to the system per unit mass of air, $c$ is the mass-specific heat capacity of air at constant volume, $dT$ is the temperature change, $L$ is the latent heat of condensation, as appropriate (energy per unit-mass of vapor condensed and possibly deposited), $dm$ is the change in mass of water vapor that changes state per unit mass of air, $p$ is the pressure of the gas, and $da$ is the change in air volume per unit mass of air. The mass of water vapor per unit mass of dry air is commonly known as the mixing ratio, and the volume per unit mass of dry air is often called specific volume, which is the reciprocal of air density.

The differential changes in all terms of the equation representing the first law of thermodynamics refer to a specified process. The process specified by the foregoing is an adiabatic process. By definition, for a perfectly adiabatic process, $dq=0$. FIG. 14 illustrates the process for a perfectly adiabatic process. The temperature scale of FIG. 14 is spaced uniformly. The pressure scale is spaced nonuniformly, and it is calibrated such that an unsaturated adiabatic process that does not involve state change of the water vapor component is a sloping straight line. Ingested air is represented by a dot at a pressure of 1000 millibars, a temperature of 85 degrees Fahrenheit, and a relative humidity of 75 percent. The actual amount of water vapor in the ingested air is 75 percent of the amount required for saturation. The maximum water vapor concentration is identified in FIG. 15 as the saturation mixing ratio, which, as previously mentioned, is defined as the ratio of the maximum mass of water vapor that can be contained per unit mass of all remaining constituents of dry air. The ratio of the actual mixing ratio of an air parcel to the saturation mixing ratio of air at the same temperature and pressure (times 100 percent) is known as relative humidity. The saturation mixing ratio is a known function of air temperature and pressure. The water vapor lines in FIG. 15 show a collection of selected values of this saturation mixing ratio function.

Figure 16:
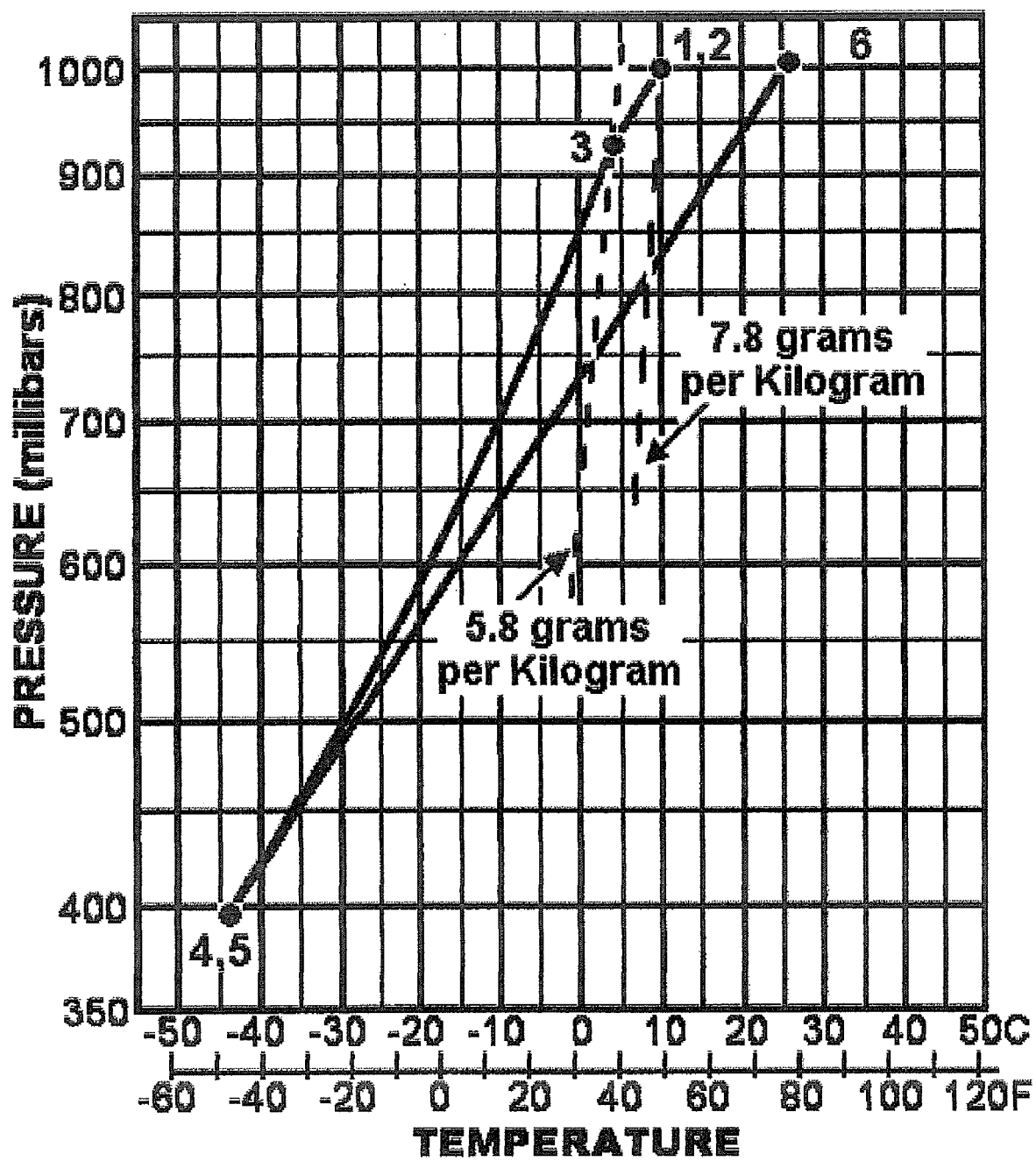
FIG. 16 is a graph illustrating the thermodynamic relationship of temperature to pressure during humid air processing, including ingestion, decompression, condensation, water extraction, recompression and harvesting.

The first stage of the decompression process specifies unsaturated adiabatic decompression. This is shown in FIG. 14 by the straight-line path extending from ingested air state toward lower pressure and cooler temperature. As this unsaturated adiabatic process proceeds, there is no condensation, hence $dm=0$. The maximum amount of water vapor maintained in a vapor state is limited, however, by the saturated mixing ratio value and is therefore specified by pressure and temperature. The lines, or adiabats, relating temperature and pressure and representing unsaturated adiabatic processes in FIG. 14 have a less positive, that is, less steep, slope than do the lines representing the water vapor saturation mixing ratio in FIG. 15. As air is decompressed adiabatically, the lines representing unsaturated adiabatic processes cross the saturation mixing ratio lines, as illustrated by FIG. 16, as they each extend toward lower values of temperature and pressure. This illustrates that the amount of water that can remain in a vapor state is rapidly decreased during the decompression process, as the unsaturated adiabatic decompression reduces both pressure and temperature, until it has been reduced to the precise amount of water vapor contained. That is, the actual mixing ratio becomes equal to the diminishing value of the saturation mixing ratio, at which point, the relative humidity reaches 100 percent. As the decompression process continues past the saturation point, the water vapor condenses to liquid water at a rate that essentially maintains the actual mixing ratio of air being decompressed at the diminishing value of the saturation mixing ratio.

The latent energy of condensation is designated, in the equation representing the first law of thermodynamics, by the term L dm. In terms of FIG. 14, which specifically tracks pressure and temperature during adiabatic decompression, the latent energy of state change remains within the adiabatically changing system and adds to the internal energy of the processed air mixture, thereby appreciably modifying the temperature-pressure relationship. The substantial amount of latent energy released during the decompression process, as water vapor condenses to liquid water, adds to the internal energy of the controlled air mixture. In terms of the equation of the first law of thermodynamics, this results in a transfer of positive amounts of L dm to an increased amount of c dT. This addition of latent heat is illustrated by FIG. 14 as a substantial departure of the decompressional change in temperature producing a smaller rate of temperature cooling with respect to pressure. To minimize the possibility of misunderstanding, adiabatic decompression after saturation will hereafter be referred to as a saturated adiabatic process to distinguish it from the initial unsaturated adiabatic process. The saturated adiabatic decompression continues to a specified endpoint indicated in FIG. 14 by a point on the process curve representing minimum pressure. At the endpoint, the represented controlled volume of air is a gaseous mixture including liquid water droplets and, possibly, ice crystals.

The maximum amount of water vapor included in atmospheric air is a small percentage, generally less than 3 or 4 percent. This statement is supported by data represented in FIG. 15, which shows saturation water vapor mixing ratios in terms of the maximum water vapor mass per unit mass of noncondensing constituents of air. The data shown in FIG. 15 represent air pressures ranging within a domain extending from 400 millibars to more than 1000 millibars, the latter being a value representative of atmospheric air at Earth's surface. As the graph illustrates, variations in the water vapor capacity are strongly related to air temperature and pressure. For a given value of pressure, the greater the temperature, the greater the water vapor capacity. For example, at a pressure of 1000mb, increasing the temperature from 30 to 90 degrees Fahrenheit increases the water vapor capacity by a factor of approximately 10. The largest value of saturation mixing ratio shown in FIG. 15 is 40 grams of water vapor per kilogram of dry air. For an ambient air density of the order of 1 kilogram per cubic meter, this maximum amount of water vapor mass represents only approximately 4 percent of the air mass. The amount of internal energy of the liquid water droplets that remain within the system is also quite small in comparison with the internal energy of the same mass of water in the vapor state. Thus, in the third process step, where removal of most or all liquid water droplets thereby removes the internal energy of those water droplets, the water removal is a nonadiabatic process step. Because the internal energy of the condensed water droplets is very small compared to the internal energy of the gaseous air mixture, however, water removal from the air mixture may be considered as being nearly adiabatic in terms of the overall mixture of gases and liquid droplets. This means that the true value of the energy added to the system per unit mass of air (dq) for loss of internal energy of small amounts of liquid water is negligibly small in comparison with the energy terms on the right side of the equation of the first law of thermodynamics previously stated.

The extraction of water can be accomplished by any of a number of methods. One method is simply to allow water that has condensed on the inner surface of the chamber 24, as shown by FIG. 7, during decompression to run downwardly under the influence of gravity, pool in the lower portion of the chamber 24, and be extracted via the water extracting valve 56 under control of the apparatus controller 54. A more efficient method includes the use of a water droplet removal device 71 (or 171 and 181 as shown by FIG. 8) as previously described.

After all, or most, liquid water droplets have been extracted from the decompressed air, the air is adiabatically recompressed toward its initial pressure and temperature. FIG. 14 illustrates this recompression from the lowest pressure point near 400 millibars upward and rightward toward the process endpoint near 1000 millibars. This recompression process illustrates a case when all liquid and solid water has been removed. In this case, the adiabatic recompression follows an unsaturated adiabatic process curve, for the water vapor content of the air becomes immediately unsaturated the instant recompression begins. This is because the actual water vapor content of air has been substantially reduced by condensation, and the recompression increases the temperature and pressure of the controlled air such that the maximum water vapor content, measured by the saturation mixing ratio, systematically exceeds the actual mixing ratio during recompression. The relative humidity is therefore systematically less than 100 percent, and recompression is unsaturated adiabatic. The recompression process remains unsaturated and adiabatic until the end of recompression. FIG. 14 shows that the decompression, nonvaporous water removal, and recompression processes bring the recompressed air to a final temperature significantly higher than was the temperature of the initially ingested air. In terms of the first law of thermodynamics, all the latent energy of condensation has been retained within the system and converted to internal energy of the recompressed air, which is manifest by virtue of the air temperature increase. As previously stated, if any liquid water droplets remain in the thermodynamic system, the initiation of adiabatic recompression would cause an evaporation of the droplets. This would involve a conversion of some internal energy of the recompressing air to latent energy of evaporation. In terms of FIG. 14, this early stage of the recompression process would follow backwardly along the same saturated adiabatic process that specified the decompression but only until all liquid water droplets or ice crystals are evaporated. After that, the process would proceed as an unsaturated adiabatic recompression. In this case, the unsaturated adiabatic process curve would be slightly to the left of the one actually shown in FIG. 14. This would lead to a slightly cooler final temperature than in the previous case, but it would still be much warmer than ingestion temperature. Note that this process option is not explicitly shown by FIG. 14.

The adiabatic process described can be served by thermally insulating any of the embodiments of the present invention from the external environment. Nonadiabatic heat exchange, dq, between the gaseous mixture contained within the apparatus 10 and the external environment of the apparatus 10 would be generally proportional to the difference between internal and external temperatures. Unlike the temperature differences attending combustion engines and similar apparatuses, as FIG. 14 indicates, such temperature differences attending the present invention would be a few tens of degrees Kelvin rather than hundreds or thousands of degrees Kelvin. Thus, thermal insulation to maintain adiabatic, thermodynamic processing can be provided using existing thermal insulation technology.

FIG. 16 quantitatively illustrates the thermodynamic relationship of temperature to pressure during humid air processing, including ingestion, decompression, condensation, water extraction, recompression, and harvesting. Atmospheric air having a temperature of 50 degrees Fahrenheit, a pressure of 1000 millibars, and a relative humidity of 75 percent is ingested. At this initial temperature and pressure, the saturation mixing ratio, as shown by FIGS. 15 and 16, is roughly 7.8 grams of water per kilogram of dry air. The actual mixing ratio would therefore be (0.75)(7.8)=5.85 grams of water per kilogram of dry air. Since the air is not initially saturated, the decompression follows an unsaturated adiabat until the air reaches a temperature and pressure at which the saturated mixing ratio equals this actual mixing ratio value. Following a saturated adiabatic process, decompression continues until a pressure of 400 millibars is reached. Water droplets are then extracted, and a subsequent unsaturated adiabatic recompression to 1000 millibars pressure brings the air to a final temperature of approximately 77 degrees Fahrenheit.

Figure 17:
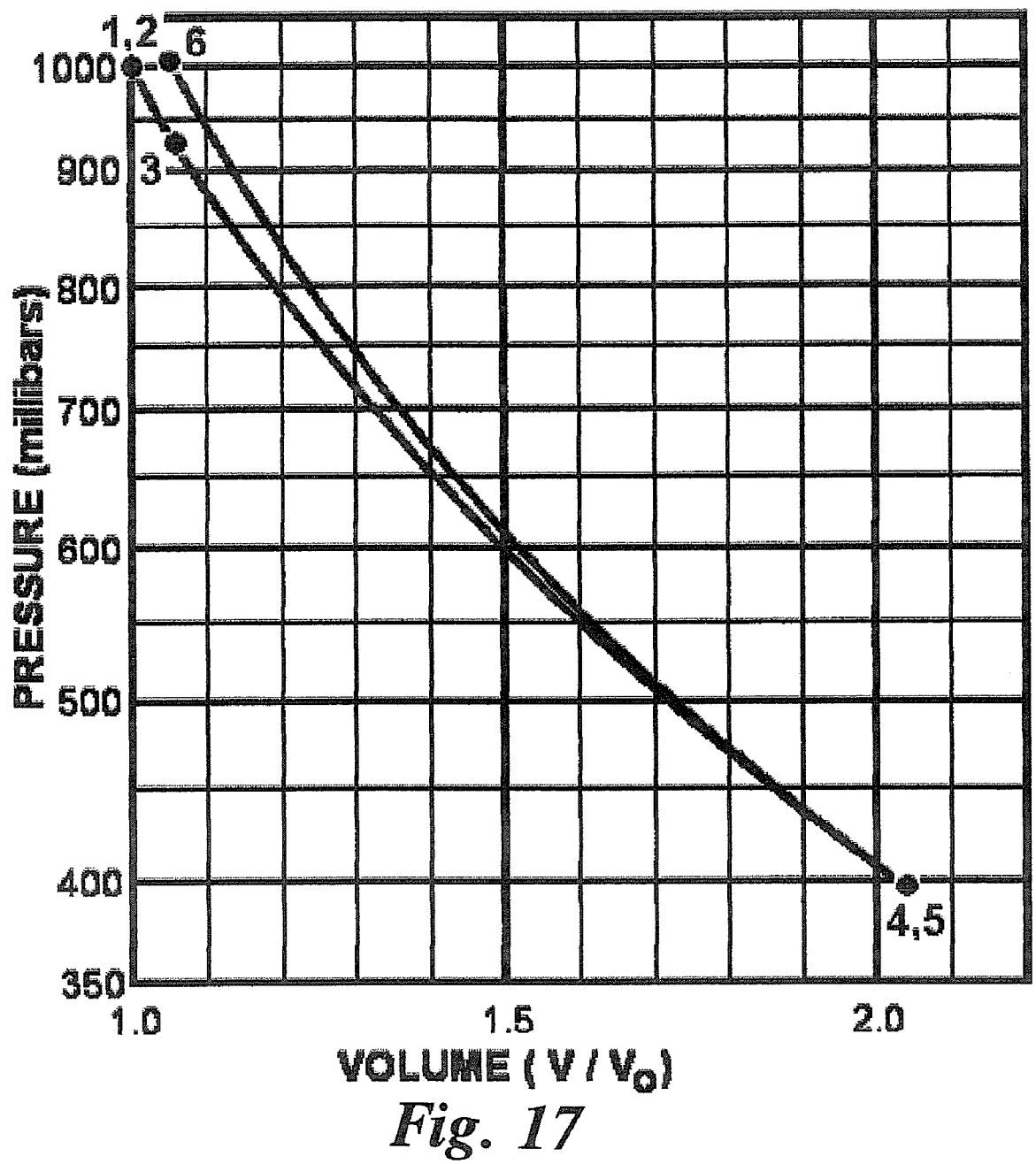
FIG. 17 is a graph illustrating the thermodynamic relationship of volume to pressure during the processing illustrated by FIG. 16.

FIG. 17 is a graph illustrating the thermodynamic relationship of volume to pressure during the processing illustrated by FIG. 16. The horizontal axis of the graph shown by FIG. 17 represents the ratio of the actual, instantaneous volume V of air being processed to the volume Vo of the initially ingested air. This initial volume Vo equals the cross-sectional area of the chamber 24 as shown by FIG. 7 times the distance between piston 16 and the closed end 22 of the cylinder 14 at the instant the air ingestion valve 52 was closed. Points 1 and 2 of the graphs of FIGS. 16 and 17 represent an air ingesting portion of the process. The portion involves no changes in temperature or pressure. At these coincident points, V and Vo are equal; and the volume ratio is therefore 1.0. Decompression begins at these coincident points, and the ratio increases until decompression ends at coincident points 4 and 5, where the volume ratio is just above 2.0. Point 3 represents a point during decompression at which included water vapor begins to undergo condensation and, possibly, deposition. It is to be noted that, since the air ingestion valve 52 is controllable, the amount of initially ingested air Vo can be set to any desired fraction of the maximum volume of the chamber 24 of the embodiment represented by FIG. 7.

Figure 20:
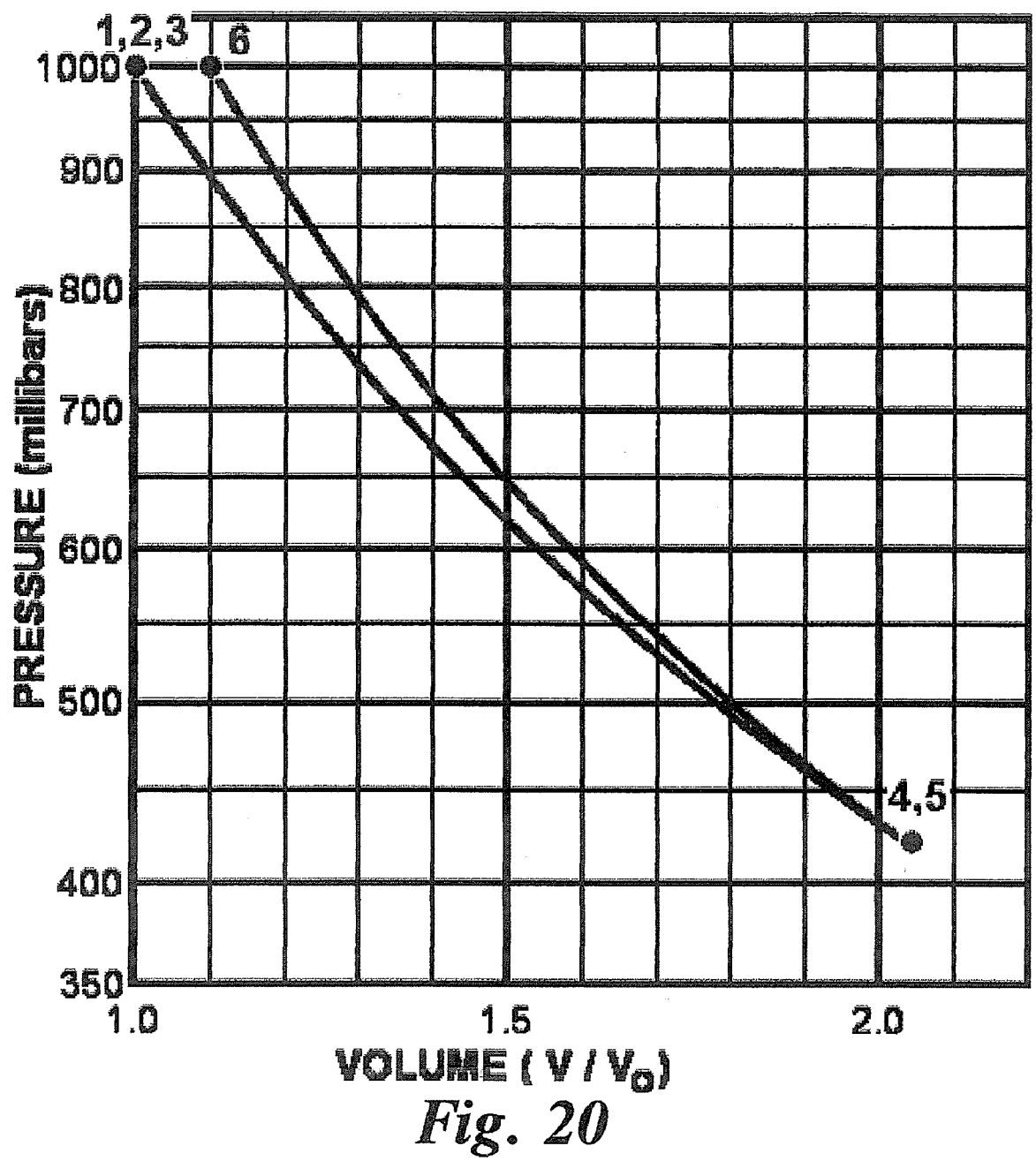
FIG. 20 is a graph illustrating the thermodynamic relationship of initial and final volume to pressure during the processing illustrated by FIG. 19.

As decompression proceeds, that is, as the piston 16 is moved farther away from the closed end 22, the instantaneous air volume V increases through values larger than the initial volume Vo. The variable of each of the horizontal scales shown by FIGS. 17 and 20 represents the ratio of expanding or contracting air volume to the initial volume Vo. The graphs therefore show the V/Vo ratio proceeding upwardly from a value of 1.0 to some maximum value determined by embodiment design. With the embodiments represented by FIGS. 7, 8 and 9, there is a limit to how much the air can be expanded. That limit for the embodiment represented by FIG. 7 is specified by the length of the piston stroke. The limit for the embodiment represented by FIG. 9 is the maximum volume that can be created by a rightward movement of the flexible diaphragm 232. The process represented by FIGS. 16 and 17 is designed to have final, decompressed volumes V, slightly more than twice the initially ingested air volume Vo.

Figure 19:
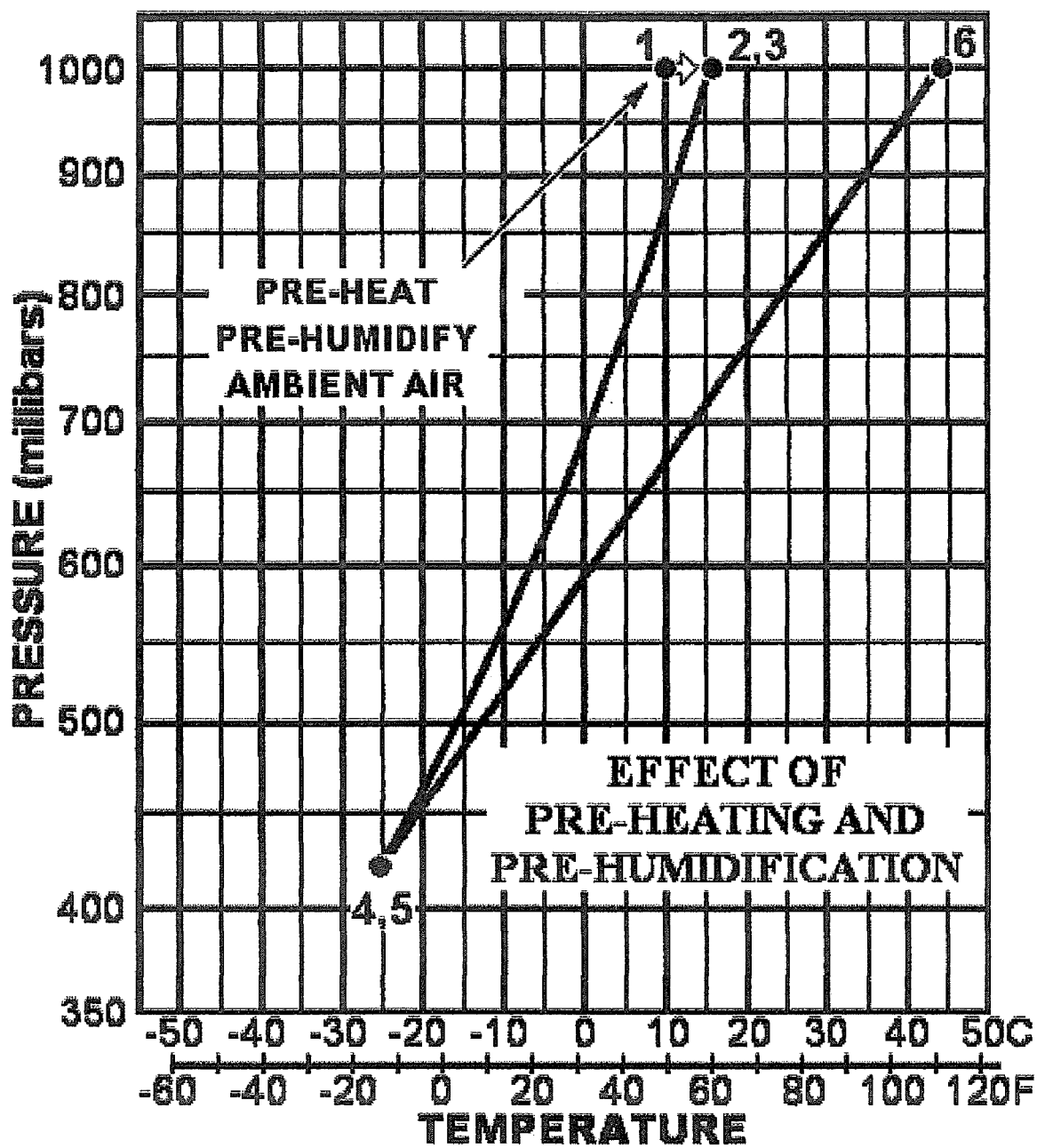
FIG. 19 is a graph illustrating the effects of prewarming and prehumidifying ingested air of the process illustrated by FIG. 16.

FIG. 19 is a graph illustrating the effect of prewarming and prehumidifying ingested air of the process shown by FIG. 16, and FIG. 20 is a graph illustrating the thermodynamic relationship of volume to pressure during the processing illustrated by FIG. 19. The horizontal axis of FIG. 20 is identical to that of FIG. 17, and the process is similarly designed to decompress the controlled air to a final decompression volume slightly more than twice the ingestion volume. An effect of the three alternatives to the first process step in using available external energy is to increase the water vapor mixing ratio prior to air ingestion. The effect of this prewarming and/or prehumidification of pre-ingested, atmospheric air is illustrated by FIG. 19, in which the temperature of the pre-ingested, atmospheric air shown by FIG. 16 is increased by just 10 Fahrenheit degrees and the water vapor content is brought to saturation at that warmer temperature. The value of the mixing ratio at a temperature of 60 degrees Fahrenheit, a pressure of 1000 millibars and a humidity of 100 percent, as shown by FIG. 15, is slightly greater than 11 grams of water per kilogram of dry air, an increase of some 3.2 grams of water per kilogram of dry air over the 7.8 grams of water per kilogram of dry air of the previous example at 50 degrees Fahrenheit.

In the third process step, as illustrated by FIG. 16, the unsaturated adiabatic decompression specified in the description of the second process step proceeds from representative points 2 to 3 as the piston 16, shown by FIG. 7, is moved rightwardly within the cylinder 14 under urging of the driver 20. As represented by point 3 of FIG. 16, the pressure and temperature of the humid air mixture attain values such that included water vapor reaches a point of saturation, begins to condense into a liquid, and possibly also to deposit to form a solid.

As decompression continues, condensation continues; and the latent heat of condensation continues to be added to the internal energy of the air mixture. As shown by FIG. 16, the increase in the internal energy decreases the rate at which the temperature of the air decreases during the nearly adiabatic expansion and decompression. The rate of change of air temperature with pressure decompression represented by FIG. 16 as being between points 2 and 3 is therefore significantly different from the rate of change represented as being between points 3 and 4.

As previously discussed in regard to the three alternatives to the first process step, if available energy is used to prewarm and/or prehumidify atmospheric air, the ingested air will have very different thermodynamic properties. In the example introduced and represented by FIG. 19, the ingested air has a temperature of 60 degrees Fahrenheit rather than the 50 degrees Fahrenheit. Moreover, the prehumidification is assumed to increase the relative humidity of the ingested air to 100 percent. These modified values are represented by point 1 (indicating the pre-ingestion, ambient conditions when the air ingestion valve 52 is opened) and point 2 (indicating the conditions of ingested air when the air ingestion valve is closed) for the prewarmed and prehumidified ingested air of FIGS. 19 and 20.

Whereas it is generally possible that some other gaseous component of atmospheric air might also come to saturation during the decompression process, as specified in the third process step, the actual values of pressure decompression from 1000 millibars to just 400 millibars in FIG. 16 essentially limits the number of common, atmospheric air constituents that come to saturation to just one, namely, water vapor.

By the end of the decompression process, specified by the arrival of the piston 16, shown by FIG. 7, at the extreme of its rightmost travel, a fraction of the initial water vapor of atmospheric air has been condensed into liquid water. Since the temperature represented by point 4 in FIG. 16 is below the freezing temperature of water, a fraction of the condensed water might have frozen into some crystalline state of ice, thereby releasing additional latent energy of solidification, which is added to the internal energy of the decompressed air.

Importantly, the prehumidification means that the air ingested is saturated so that point 2, representing an ingestion condition, and point 3, representing saturation, coincide in FIGS. 19 and 20. This is significantly different in comparison with the example of atmospheric air ingested as represented by FIG. 16, where the air follows an unsaturated adiabatic decompression from point 2 to point 3 and thereafter follows a saturated adiabat from point 3 to point 4. The temperature represented by point 4 of FIG. 16 is approximately −47 degrees Fahrenheit, whereas the temperature represented by point 4 for prewarmed and prehumidified air represented by FIG. 19 is only approximately −15 degrees Fahrenheit. The difference between these temperatures at full decompression illustrates the additional latent energy realized as a result of prewarming and prehumidifying ingested air by available external energy as illustrated by FIG. 19. In the cylinder-piston mechanism shown by FIG. 7, the decompression process is executed by a specified change in volume of ingested air as the piston 16 moves from its position at the moment of closure of the air ingestion valve 52 to its most extreme position under control of the apparatus controller 54. This volumetric change is identical for the examples shown by FIGS. 17 and 20, and a consequence is the resulting difference in minimum pressures represented by the position of point 4 in FIGS. 16 and 19.

Adiabatic recompression of the controlled quantity of air proceeds, as represented in FIGS. 16, 17, 19 and 20, from points 5 to points 6 (the latter indicating the final state of controlled air after being recompressed to a pressure of the ambient air), respectively. The recompression is accomplished by moving the piston 16, shown by FIG. 7, leftwardly toward the closed end 22 of the cylinder 14 under urging of the driver 20. During the recompression process, a small portion of internal energy of the controlled air might be used to melt any ice crystals and to re-evaporate any water droplets that were not effectively removed from the air during the third process step. If that is the case, a first portion of adiabatic recompression would be represented as a reversed movement between points 4 and 3 of FIGS. 16, 17, 19 and 20, respectively, until remaining ice crystals and water droplets are fully converted to water vapor. After that, adiabatic recompression would be represented as following a straight-line path nearly parallel to the process path from points 5 toward points 6.

As shown by FIGS. 16, 17, 19 and 20, the removal of a substantial fraction of water droplets and ice crystals from the decompressed air provides an adiabatic recompression process that returns the air to its initial pressure with a substantially higher temperature than it had upon its ingestion. The substantial temperature difference is due to the latent energies of condensation and solidification that have been added to the internal energy of the recompressed air.

Note that the location of points 6 along the adiabatic recompression curves is a function of the position of the piston 16 within the cylinder 14 of FIG. 7 when the air harvesting valve 67 is opened. For example, point 6, which represents the volume in the chamber 24 following the recompression process in FIG. 17, is not at the same location as is point 1, which represents the volume of initially ingested air. Rather, point 6 is located at a position indicating a slightly larger volume. If opening the air harvesting valve 67 is delayed until the recompression process returns the recompressed air to its initial volume, the final temperature and pressure will both be higher than represented by point 6 in FIG. 16. This would represent an even greater thermal difference and a positive pressure difference relative to those of the environment. The recompression process illustrated by FIGS. 19 and 20 is specified to finish when the recompressed air arrives at the air ingestion pressure and the apparatus controller 54 opens the air harvesting valve 67. With conditions as represented by the points 6 of FIGS. 19 and 20, and in anticipation of a subsequent air decompression-recompression processing cycle, the recompressed air is harvested by opening the air harvesting valve 67. The thermal energy of the harvested air can then be retained for use at a later time by, for example, changing the state of another material, or it can be used immediately by converting it to electric energy and/or mechanical energy using such devices as previously described.

The final thermodynamic conditions (point 6) of recompressed air in the examples in FIG. 16 (untreated atmospheric air) and FIG. 19 (atmospheric air prewarmed and prehumidified by available external energy sources) are each significantly different from the ingestion conditions. Moreover, as previously mentioned, the final thermodynamic conditions of the example in FIG. 19 are significantly different from the corresponding endpoint in FIG. 16. The final air temperature at point 6 of FIG. 16 is approximately 77 degrees Fahrenheit whereas the final air temperature at point 6 of the atmospheric air that has been prewarmed and prehumidified by available external energy in FIG. 19 is approximately 114 degrees Fahrenheit. This final process temperature is 64 Fahrenheit degrees warmer than the initial, atmospheric temperature of the air, and approximately 37 Fahrenheit degrees warmer than the final recompressed air represented by FIG. 16 using no prewarming or prehumidification. As a result of prehumidification, even with salinated or otherwise impure water, and of prewarming, the amount of potable water harvested, as well as the amount of latent energy harvested, is increased substantially. As previously mentioned, the harvested water is increased from 5.8 grams to 11 grams of water per kilogram of dry air.

An analysis based on the thermodynamic definition of the internal energy of the exemplary processed air shows that, at process conclusion, the air of each example has a greater amount of thermodynamic free energy than it had upon its ingestion. Such an analysis also clearly demonstrates that the preliminary use of available external energy can significantly enhance the final recompressed air temperature produced by the process described. To put the integration of available external energy into perspective, latent energy extraction, decompression work required, and recompression work recovery have been computed for the examples shown by FIGS. 16, 17, 19 and 20. The values are easily interpreted for the exemplary embodiments in FIGS. 7, 8 and 9 where the decompression work required is to pull the pistons 16 or 116 or pull the flexible diaphragm 232 away from their respective closed ends, 22, 122 or 222, respectively. The recompression work is recoverable work on the piston or diaphragm supplied by the difference between the pressure of the decompressed air and the higher pressure of ambient air.

Figure 18:
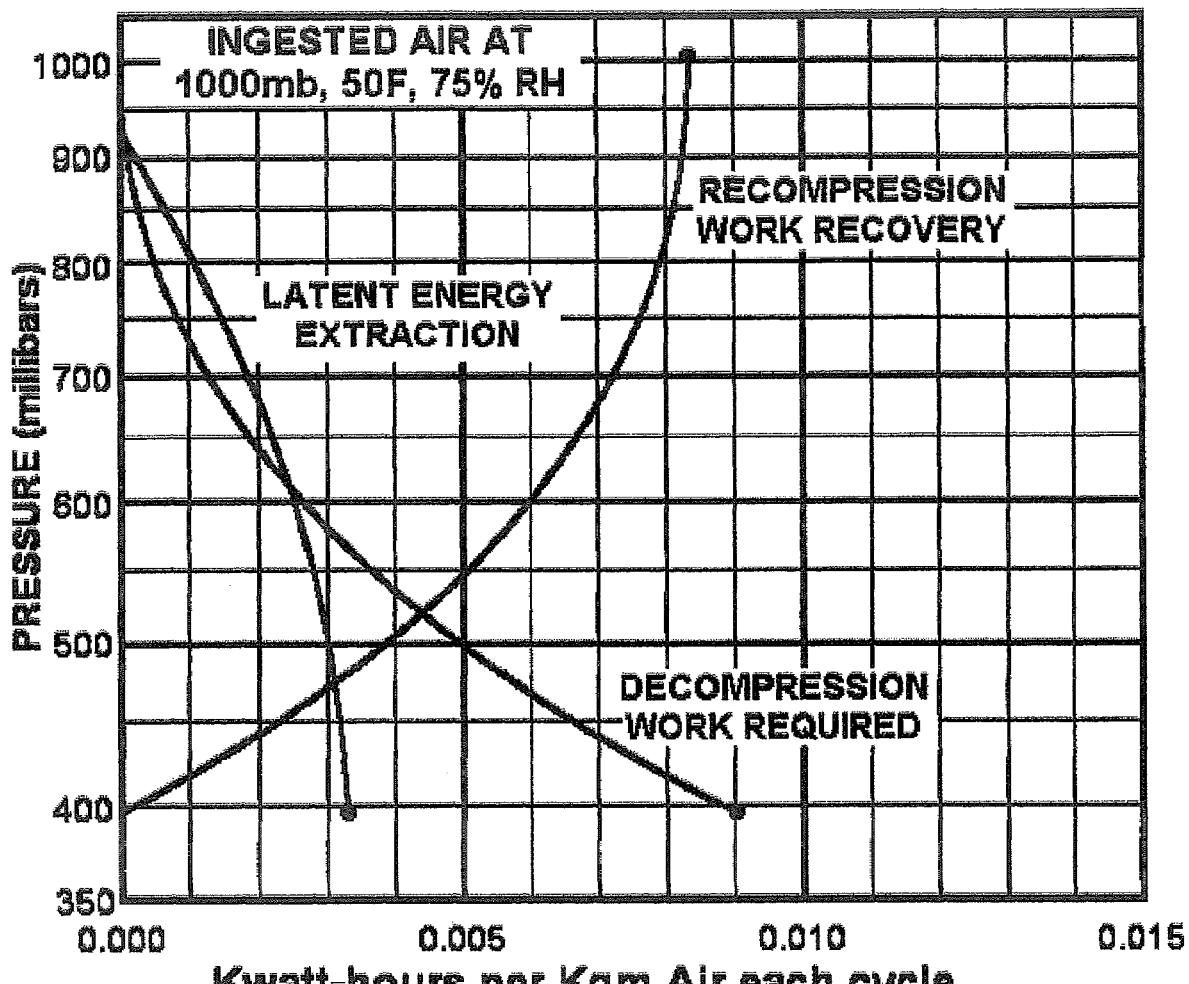
FIG. 18 is a graph illustrating the amount of latent energy harvesting, required decompression work and recoverable recompression work using atmospheric air in the processes illustrated by FIGS. 16 and 17.
Figure 21:
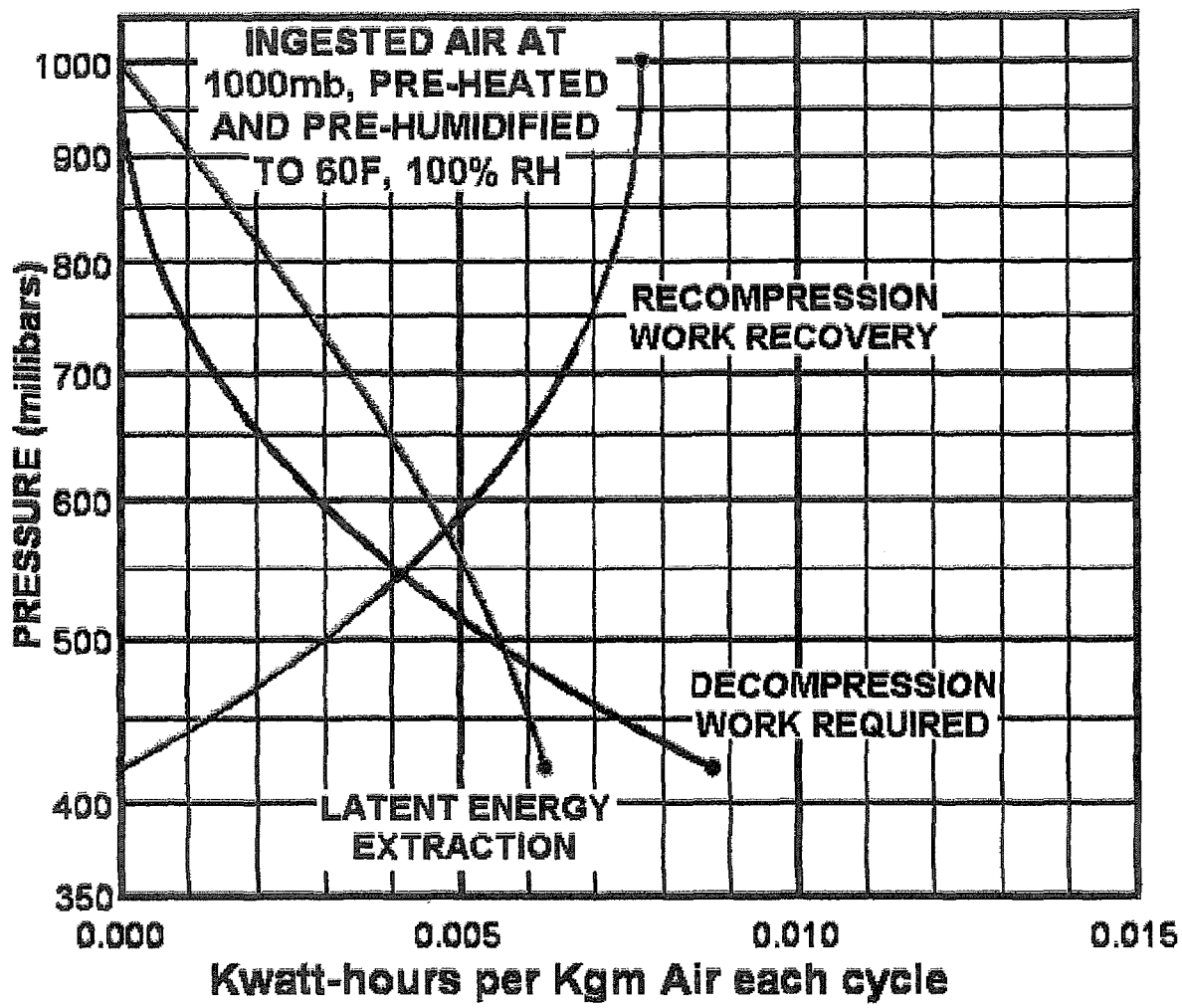
FIG. 21 is a graph similar to FIG. 18 and illustrates the amount of latent energy harvesting, required decompression work and recoverable recompression work using atmospheric air in the processes illustrated by FIGS. 19 and 20.

FIG. 18 illustrates the process results for air ingested at 1000 mb, 50 degrees Fahrenheit and 75 percent relative humidity. FIG. 21 illustrates the process results for a similar volume of air ingested at 1000 mb, prewarmed to a higher temperature of 60 degrees Fahrenheit and prehumidified to a higher relative humidity of 100 percent using available external energy and humidity sources. The process curves trace the details of the process, and the final results are represented by endpoints. Separate curves are shown in FIGS. 18 and 21 for latent energy harvesting from the processed air, work required to force the decompression process, and recoverable work as recompression occurs while returning to an air harvest position. The curves trace the accumulated values of these quantities, and the endpoints on each curve show the final values. In both figures, it can be seen that latent energy harvesting becomes more and more difficult as the decompression process progresses. FIG. 18 shows that the latent energy harvested falls significantly short of the level of energy required to perform the decompression work required. When the air is prewarmed and prehumidified, however, even by a relatively small amount as shown by FIG. 21, the latent energy is considerably increased and the decompression work required is reduced somewhat, thus significantly increasing the ratio of latent energy extraction to net work supplied.

These results should not be interpreted as a violation of the laws of thermodynamics, and they should not be viewed as support for any sort of "perpetual motion" apparatus. No additional energy is "created." Latent energy, the internal energy associated with the state of a system, is already present in water and is merely converted to thermodynamic free energy, the energy in a physical system that can be converted to do work, by changing the state of the water.

Harvesting latent energy by this process can be considered as being analogous to sailing a sailboat. The energy a sailboat extracts from ambient wind clearly exceeds the work required by the sailor to operate the tiller. The latent energy extracted from natural, environmentally energetic, humid air exceeds the difference between work that must be supplied for decompression and work recovered during recompression. The net energy harvested is provided by nature and not by the operator of this energy process apparatus 10.

While the best mode for carrying out the invention has been illustrated and described in detail, it is not intended that all possible forms of the invention have been illustrated and described. Rather, the words used in the specification are words of description and not of limitation; and it is to be understood by those familiar with the art to which this invention pertains that various changes may be made without departing from the spirit and scope of the invention as defined by the following claims.

What is claimed is:

1. A method of operating a mechanically and thermodynamically closed system that is at least one magnitude smaller than devices that depend on natural, altitude-dependent air density differences for harvesting latent energy and water from atmospheric air, one of a desired number of cycles of the method comprising the steps of:
    (a) ingesting a mechanically controlled volume of atmospheric air into a thermally insulated chamber;
    (b) adiabatically decompressing the controlled volume of air to decrease the temperature and pressure within the chamber to a point where (1) the pressure equals the saturation vapor pressure of water vapor within the chamber, (2) the water vapor commences to change state to nonvaporous water, (3) the adiabatic decompression continues to decrease pressure, temperature, and saturation vapor pressure, producing a continuation of the water vapor phase change to nonvaporous water, and (4) the water vapor change of phase continues to release latent energy into the air within the chamber;
    (c) extracting from the chamber the nonvaporous water that resulted from the state change of the water vapor to nonvaporous water and retaining the nonvaporous water in a separate, insulated reservoir, at the same pressure as that of the decompressed air within the chamber, to render the process of latent energy release nearly irreversible;
    (d) adiabatically compressing the previously decompressed air in the chamber so that, as a result of having absorbed the latent energy released by the water vapor, the recompressed air has a much higher temperature, and a greater amount of thermal energy, than had the ingested air before being decompressed because the recompressed air retains the thermal energy that would be required to change the state of the nonvaporous water back into vapor had the nonvaporous water not been extracted from the chamber; and
    (e) extracting the recompressed air from the chamber and conducting the recompressed air to an external thermal energy harvesting device and harvesting the greater amount of thermal energy from the recompressed air.

2. The method of claim 1, further comprising step (f) of harvesting nonvaporous water extracted from the thermally insulated chamber during step (c).

3. The method of claim 1, further comprising a step before step (a), the additional step comprising prewarming the controlled volume of atmospheric air before the air is ingested.

4. The method of claim 1, further comprising a step before step (a), the additional step comprising prehumidifying the controlled volume of atmospheric air, sufficiently to ensure a saturated adiabatic decompression, before the air is ingested.

5. The method of claim 1, further comprising steps before step (a), the additional steps comprising prewarming and prehumidifying the controlled volume of atmospheric air, sufficiently to ensure a saturated adiabatic decompression, before the air is ingested.

6. The method of claim 1, wherein recompressing the decompressed air during step (d) is terminated when the measured pressure of the recompressing air reaches that of the initial controlled volume of air.

7. The method of claim 1, wherein recompressing the decompressed air during step (d) is terminated when the controlled volume of the recompressing air reaches that of the initial controlled volume of air.

8. The method of claim 1, wherein recompressing the decompressed air during step (d) is terminated when the pressure and the volume of the recompressing air are at a state represented by a point along an unsaturated adiabat between a point where the pressure of the recompressing air reaches that of the initial pressure of air and a point where the volume of the recompressing air reaches that of the initial controlled volume of air.

* * * * *

UNITED STATES PATENT AND TRADEMARK OFFICE
CERTIFICATE OF CORRECTION

PATENT NO. : 7,775,063 B2  Page 1 of 1
APPLICATION NO. : 11/627216
DATED : August 17, 2010
INVENTOR(S) : Christopher E. Thompson et al.

It is certified that error appears in the above-identified patent and that said Letters Patent is hereby corrected as shown below:

Column 24, Line 8, Claim 1:

Delete "adiabatically compressing" and

Insert -- adiabatically recompressing --.

Signed and Sealed this

Seventh Day of December, 2010

David J. Kappos
*Director of the United States Patent and Trademark Office*